(12) United States Patent
Ko et al.

(10) Patent No.: US 12,543,178 B2
(45) Date of Patent: Feb. 3, 2026

(54) WIRELESS COMMUNICATION METHOD USING NETWORK ALLOCATION VECTOR AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Geonjung Ko, Gyeonggi-do (KR); Juhyung Son, Gyeonggi-do (KR); Woojin Ahn, Gyeonggi-do (KR); Jinsam Kwak, Gyeonggi-do (KR)

(73) Assignees: WILUS INSTITUTE OF STANDARDS AND TECHNOLOGY INC., Gyeonggi-do (KR); SK TELECOM CO., LTD., sEOUL (KR)

( * ) Notice: Subject to any disclaimer, the term of this patent is extended or adjusted under 35 U.S.C. 154(b) by 460 days.

(21) Appl. No.: 16/375,754

(22) Filed: Apr. 4, 2019

(65) Prior Publication Data
US 2019/0239205 A1    Aug. 1, 2019

Related U.S. Application Data

(63) Continuation of application No. PCT/KR2017/011617, filed on Oct. 19, 2017.

(30) Foreign Application Priority Data

Oct. 19, 2016 (KR) .................. 10-2016-0136095
Nov. 6, 2016 (KR) .................. 10-2016-0147190
(Continued)

(51) Int. Cl.
*H04W 74/00* (2009.01)
*H04B 7/26* (2006.01)
(Continued)

(52) U.S. Cl.
CPC .............. *H04W 72/20* (2023.01); *H04B 7/26* (2013.01); *H04W 74/006* (2013.01); *H04W 84/12* (2013.01)

(58) Field of Classification Search
None
See application file for complete search history.

(56) References Cited

U.S. PATENT DOCUMENTS

2015/0131511 A1*  5/2015  Ghosh ............... H04W 16/14
                                                        370/312
2016/0029373 A1   1/2016  Seok
(Continued)

FOREIGN PATENT DOCUMENTS

CN        104350799        2/2015
EP        3 024 295        5/2016
(Continued)

OTHER PUBLICATIONS

International Search Report for PCT/KR2017/011617 mailed on Feb. 5, 2018 and its English translation from WIPO (now published as WO 2018/074871).
(Continued)

*Primary Examiner* — The Hy Nguyen
(74) *Attorney, Agent, or Firm* — WOMBLE BOND DICKINSON (US) LLP

(57) ABSTRACT

Provided is a wireless communication terminal that communicates wirelessly. The wireless communication terminal includes a transceiver and a processor. The processor is configured to receive the trigger frame using the transceiver and update the network allocation vector based on the trigger frame. At this time, the trigger frame triggers transmission of at least one wireless communication terminal.

6 Claims, 23 Drawing Sheets

(30) Foreign Application Priority Data

Mar. 8, 2017 (KR) .................. 10-2017-0029524
May 8, 2017 (KR) .................. 10-2017-0057638

(51) Int. Cl.
*H04W 72/20* (2023.01)
*H04W 84/12* (2009.01)

(56) References Cited

U.S. PATENT DOCUMENTS

| | | | |
|---|---|---|---|
| 2016/0128057 A1* | 5/2016 | Seok | H04L 5/0028 370/329 |
| 2016/0183253 A1* | 6/2016 | Merlin | H04W 74/0808 370/329 |
| 2016/0242210 A1 | 8/2016 | Seok | |
| 2017/0006541 A1* | 1/2017 | Huang | H04W 74/006 |
| 2017/0064708 A1* | 3/2017 | Noh | H04L 5/0023 |
| 2017/0064739 A1* | 3/2017 | Hedayat | H04L 5/0025 |
| 2017/0094685 A1* | 3/2017 | Noh | H04W 74/0816 |
| 2017/0104563 A1* | 4/2017 | Lee | H04L 5/0044 |
| 2017/0142659 A1* | 5/2017 | Noh | H04W 52/0229 |
| 2017/0201981 A1* | 7/2017 | Huang | H04W 74/0816 |
| 2017/0230981 A1* | 8/2017 | Ryu | H04W 74/006 |
| 2018/0146469 A1* | 5/2018 | Luo | H04L 69/22 |
| 2018/0279369 A1* | 9/2018 | Xing | H04W 4/06 |
| 2018/0317166 A1* | 11/2018 | Huang | H04W 52/0209 |
| 2019/0007973 A1* | 1/2019 | Lou | H04W 74/0816 |
| 2019/0200387 A1* | 6/2019 | Chitrakar | H04W 74/0816 |

FOREIGN PATENT DOCUMENTS

| | | |
|---|---|---|
| EP | 3 054 736 | 8/2016 |
| GB | 201604208 | 4/2016 |
| KR | 10-1087286 | 11/2011 |
| KR | 10-2014-0117336 | 10/2014 |
| KR | 10-2014-0130119 | 11/2014 |
| KR | 10-2015-0052799 | 5/2015 |
| KR | 10-2015-0054624 | 5/2015 |
| KR | 10-2016-0045023 | 4/2016 |
| KR | 10-2016-0060578 | 5/2016 |
| KR | 10-2016-0064003 | 6/2016 |
| KR | 10-1664406 | 10/2016 |
| KR | 10-1933738 | 12/2018 |
| KR | 10-2019-0035426 | 4/2019 |
| KR | 10-2297358 | 9/2021 |
| KR | 10-2303117 | 9/2021 |
| WO | 2015/141293 | 9/2015 |
| WO | 2016/108633 | 7/2016 |
| WO | 2018/074871 | 4/2018 |

OTHER PUBLICATIONS

Written Opinion of the International Searching Authority for PCT/KR2017/011617 mailed on Feb. 5, 2018 and its English translation by Google Translate (now published as WO 2018/074871).
Ko, Geonjung et al., "NAV Update Rule Considering UL MU Operation", doc.: IEEE 802.11-16/1423r0, uploaded on Nov. 7, 2016, Slides 1-9.
Office Action dated Sep. 24, 2021 for Korean Patent Application No. 10-2019-7008968 and its English translation provided by the Applicant's foreign counsel.
Notice of Allowance dated Mar. 3, 2022 for Korean Patent Application No. 10-2019-7008968 and its English translation provided by the Applicant's foreign counsel.
Office Action dated Jun. 17, 2022 for Korean Patent Application No. 10-2022-7018788 and its English Translation provided by Applicant's foreign counsel.
Office Action dated Jun. 23, 2022 for Chinese Patent Application No. 201780064553.5 and its English Translation provided by Applicant's foreign counsel.
Notice of Allowance dated Dec. 6, 2022 for Korean Patent Application No. 10-2022-7018788 and its English Translation provided by Applicant's foreign counsel.
Notice of Allowance dated Apr. 12, 2023 for Korean Patent Application No. 10-2023-7007881 and its English Translation provided by Applicant's foreign counsel.
Hearing Notice dated Jun. 30, 2023 for Indian Patent Application No. 201927012271.
Office Action (1st) dated Jun. 23, 2025 for Chinese Patent Application No. 202310324251.4 and its English translation provided by Applicant's foreign counsel.
Office Action (1st) dated Aug. 19, 2025 for Chinese Patent Application No. 202310324724.0 and its English translation provided by Applicant's foreign counsel.

* cited by examiner

(a) Trigger frame

| Frame Control | Duration | RA | TA | Common Info | User Info | ... | User Info | Padding | FCS |
|---|---|---|---|---|---|---|---|---|---|
| Octets: 2 | 2 | 6 | 6 | | | | | | 4 |

(b) Common Info

| B0  B3 | B4  B15 | B16 | B17 | B18  B19 | B20  B21 | B22 | B23  B25 | B26 |
|---|---|---|---|---|---|---|---|---|
| Trigger Type | Length | Cascade Indication | CS Required | BW | GI and LTF Type | MU-MIMO LTF Mode | Number of HE-LTF Symbols | STBC |
| Bits: 4 | 12 | 1 | 1 | 2 | 2 | 1 | 3 | 1 |

| B27 | B28  B33 | B34  B36 | B37  B52 | B53 | B54  B62 | B63 | |
|---|---|---|---|---|---|---|---|
| LDPC Extra Symbol | AP TX Power | Packet Extension | Spatial Reuse | Doppler | HE-SIG-A Reserved | Reserved | Trigger Dependent Common Info |
| Bits: 1 | 6 | 3 | 16 | 1 | 9 | 1 | variable |

*FIG. 7*

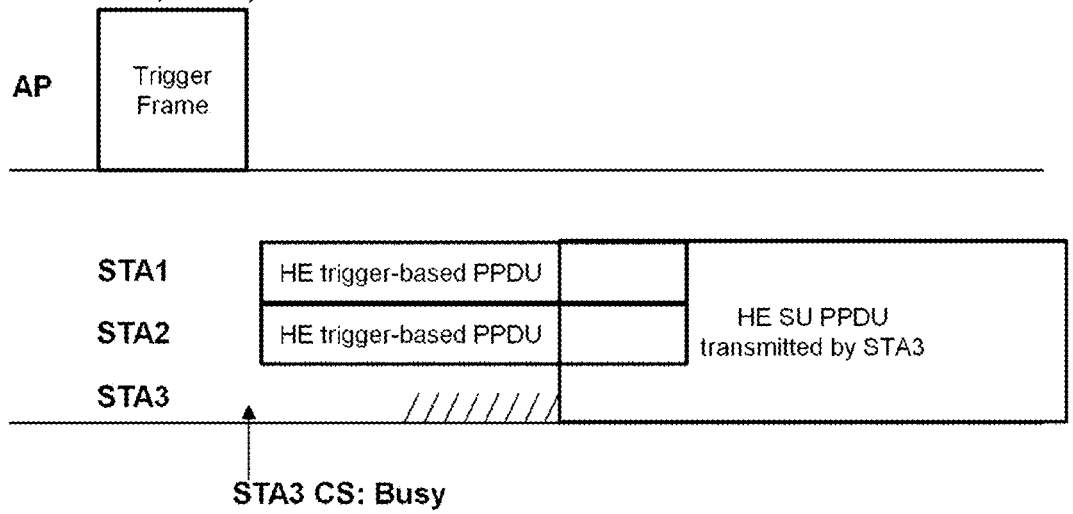
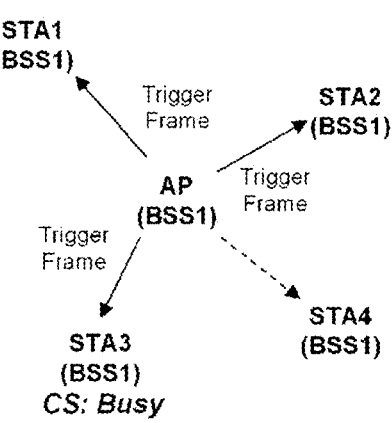
FIG. 8

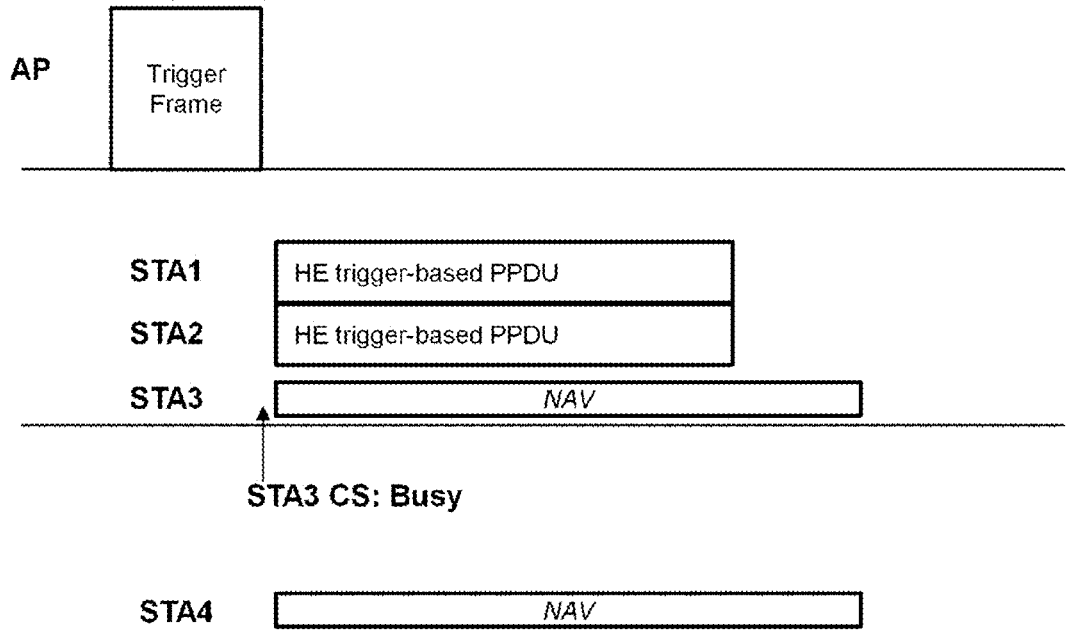
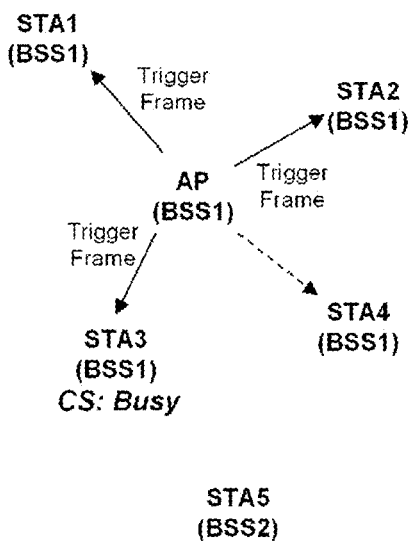
FIG. 9

(a)
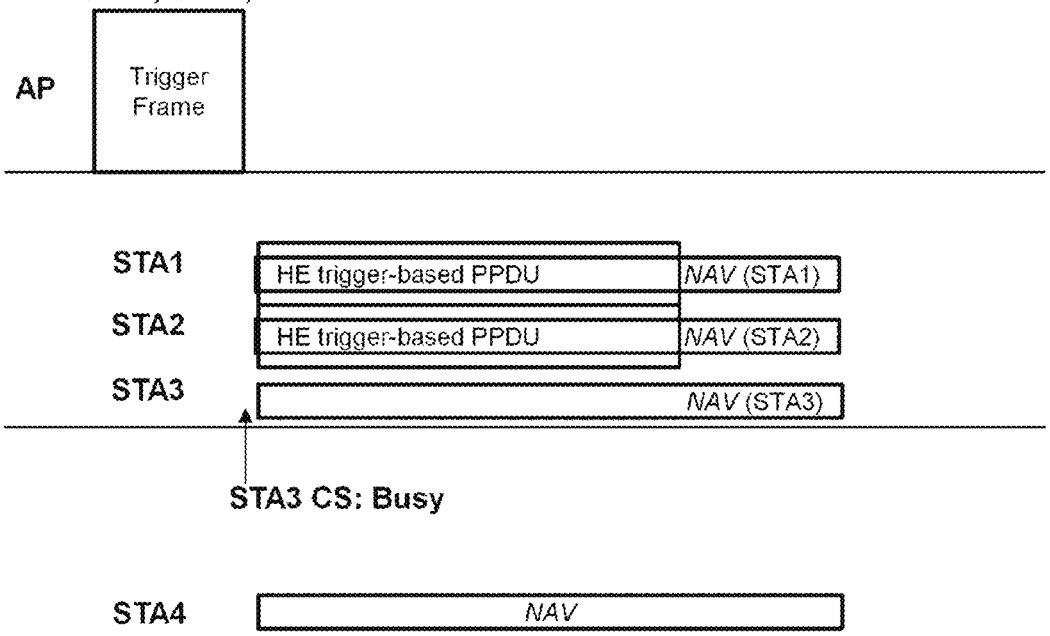
(b)
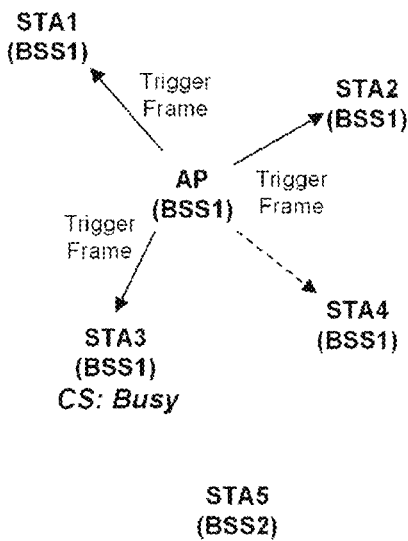
*FIG. 10*

(a) For a non-HT PPDU, HT PPDU and VHT PPDU

$$L_{PAD,MAC} = \left\lceil \frac{N_{DBPS} m_{PAD}}{8} \right\rceil \text{ octets}$$

$$m_{PAD} = \begin{cases} 0, \text{ max TF MAC Padding Duration among receiving STAs} = 0 \text{ μs} \\ 2, \text{ max TF MAC Padding Duration among receiving STAs} = 8 \text{ μs} \\ 4, \text{ max TF MAC Padding Duration among receiving STAs} = 16 \text{ μs} \end{cases}$$

(b) For an HE PPDU

$$L_{PAD,MAC} = \left\lceil \frac{N_{DBPS,SHORT} m_{PAD}}{8} \right\rceil \text{ octets}$$

$$m_{PAD} = \begin{cases} 0, \text{ max TF MAC Padding Duration among receiving STAs} = 0 \text{ μs} \\ 2, \text{ max TF MAC Padding Duration among receiving STAs} = 8 \text{ μs} \\ 4, \text{ max TF MAC Padding Duration among receiving STAs} = 16 \text{ μs} \end{cases}$$

*FIG. 19*

WIRELESS COMMUNICATION METHOD USING NETWORK ALLOCATION VECTOR AND WIRELESS COMMUNICATION TERMINAL USING SAME

CROSS-REFERENCE TO RELATED APPLICATIONS

This application is a continuation of International Patent Application No. PCT/KR2017/011617 filed on Oct. 19, 2017, which claims the priority to Korean Patent Application No. 10-2016-0136095 filed in the Korean Intellectual Property Office on Oct. 19, 2016, Korean Patent Application No. 10-2016-0147190 filed in the Korean Intellectual Property Office on Nov. 6, 2016, Korean Patent Application No. 10-2017-0029524 filed in the Korean Intellectual Property Office on Mar. 8, 2017, and Korean Patent Application No. 10-2017-0057638 filed in the Korean Intellectual Property Office on May 8, 2017, the entire contents of which are incorporated herein by reference.

TECHNICAL FIELD

The present invention relates to a wireless communication method and a wireless communication terminal using an enhanced network allocation vector.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel Therefore, required is a technology capable of efficiently using bandwidths by simultaneously transmitting data between a plurality of terminals and base terminals.

DISCLOSURE

Technical Problem

An object of an embodiment of the present invention is to provide a wireless communication terminal using a network allocation vector.

Technical Solution

According to an embodiment of the present invention, a wireless communication terminal associated with a base wireless communication terminal includes: a transceiver; and a processor. At this time, the processor is configured to receive a Physical layer Protocol Data Unit (PPDU) from the base wireless communication terminal using the transceiver, obtain a trigger frame from the PPDU, and update a Network Allocation Vector (NAV) based on the trigger frame. The trigger frame may trigger transmission of at least one wireless communication terminal.

The processor may be configured to transmit a trigger-based PPDU to the base wireless communication terminal based on the trigger frame regardless of a value of the NAV set based on a frame transmitted from a basic service network operated by the base wireless communication terminal.

The processor may be configured to update the NAV based on the trigger frame regardless of a receiver address of the trigger frame.

The processor may be configured to update the NAV based on the trigger frame regardless of whether the trigger frame triggers the transmission of the wireless communication terminal.

When the trigger frame indicates that channel sensing is required before transmitting a trigger-based PPDU based on the trigger frame, the processor may be configured to update the NAV based on the trigger frame.

When the channel for transmitting the trigger-based PPDU is sensed to be busy by the channel sensing, the processor may be configured to update the NAV based on the trigger frame.

The processor may be configured to update the NAV based on a time required for the channel sensing and the trigger frame.

According to an embodiment of the present invention, a base wireless communication terminal communicated with a wireless communication terminal includes: a transceiver; and a processor. The processor is configured to receive a Physical layer Data Unit (PPDU) using the transceiver and determine whether the PPDU is a valid PPDU based on whether the PPDU is a trigger-based PPDU triggered by the base wireless communication terminal.

When the PPDU is not a trigger-based PPDU triggered by the base wireless communication terminal and the PPDU is transmitted through a frequency band that does not overlap a primary channel of a Basic Service Set (BSS) operated by the base wireless communication terminal, the processor may be configured to determine that the PPDU is an invalid PPDU.

When the PPDU is not a trigger-based PPDU triggered by the base wireless communication terminal and the PPDU is transmitted through a frequency band that does not overlap a primary channel of a BSS operated by the base wireless communication terminal, the processor may be configured not to issue an indicator indicating PPDU reception start.

When the PPDU is a trigger-based PPDU triggered by the base wireless communication terminal, even when the PPDU is transmitted through a frequency band that does not overlap the primary channel of the BSS operated by the base wireless communication terminal, the processor may be configured to issue an indicator indicating PPDU reception start based on the signaling field of the PPDU.

According to an embodiment of the present invention, an operation method of a wireless communication terminal associated with a base wireless communication terminal includes: receiving a Physical layer Protocol Data Unit (PPDU) from the base wireless communication terminal; obtaining a trigger frame from the PPDU; and updating a Network Allocation Vector (NAV) based on the trigger frame. At this time, the trigger frame triggers transmission of at least one wireless communication terminal.

The method may further include transmitting a trigger-based PPDU to the base wireless communication terminal based on the trigger frame regardless of a value of the NAV set based on a frame transmitted from a basic service network operated by the base wireless communication terminal.

The updating of the NAV may include updating the NAV based on the trigger frame regardless of a receiver address of the trigger frame.

The updating of the NAV may include updating the NAV based on the trigger frame regardless of whether the trigger frame triggers the transmission of the wireless communication terminal.

The updating of the NAV may include, when the trigger frame indicates that channel sensing is required before transmitting a trigger-based Physical layer Data Unit (PPDU) based on the trigger frame, updating the NAV based on the trigger frame.

The updating of the NAV may include, when the channel for transmitting the trigger-based PPDU is sensed to be busy by the channel sensing, updating the NAV based on the trigger frame.

The updating of the NAV may include updating the NAV based on a time required for the channel sensing and the trigger frame.

Advantageous Effects

An embodiment of the present invention provides a wireless communication method using a network allocation vector and a wireless communication terminal using the wireless communication method.

DESCRIPTION OF DRAWINGS

FIG. 7 shows a trigger frame format according to an embodiment of the present invention.

FIG. 8 shows a case where a wireless communication terminal that receives a trigger frame fails to transmit a trigger-based PPDU based on a CS result according to an embodiment of the present invention.

FIG. 9 shows an operation in which a wireless communication terminal updates a NAV according to another embodiment of the present invention.

FIG. 10 shows an operation in which a wireless communication terminal updates a NAV according to another embodiment of the present invention.

FIG. 19 shows a method of a wireless communication terminal to set a padding length of a trigger frame according to an embodiment of the present invention.

FIGS. 24 to 23 show operations in which a wireless communication terminal according to another embodiment receives a PPDU and issues a PHY-RXSTART.indication.

MODE FOR CARRYING OUT THE INVENTION

Figure 1:
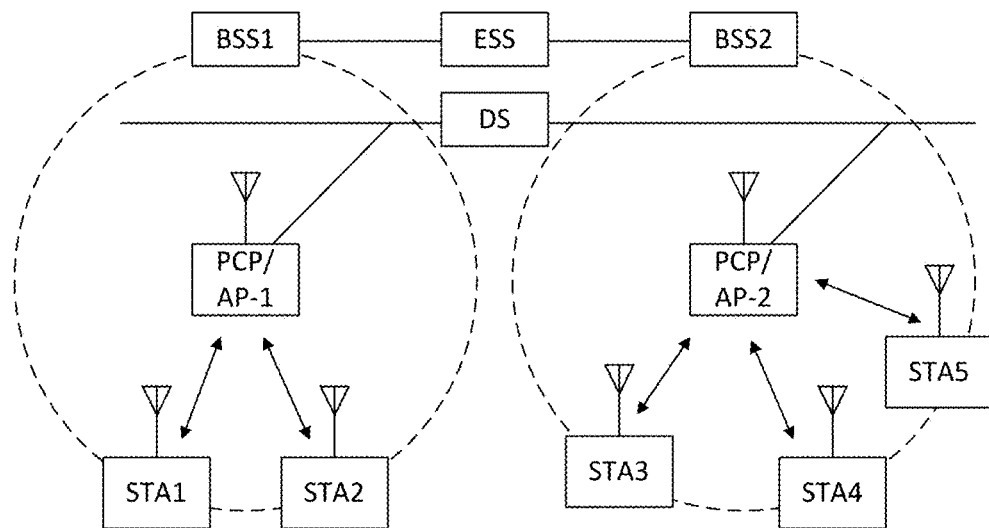
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0136095 (2016.10.19), Nos. 10-2016-0147190 (2016.11.06), Nos. 10-2017-0029524 (2017.03.08), and Nos. 10-2017-0057638 (2017.05.08) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
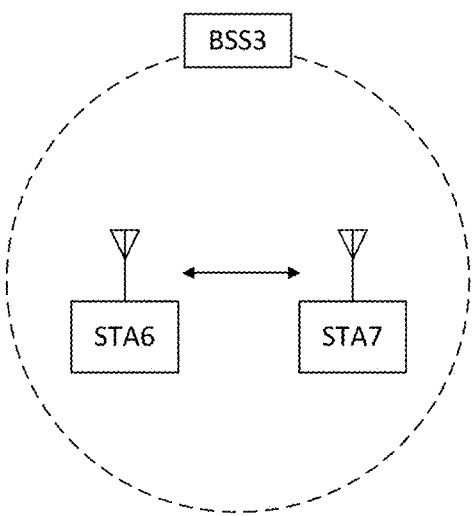
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
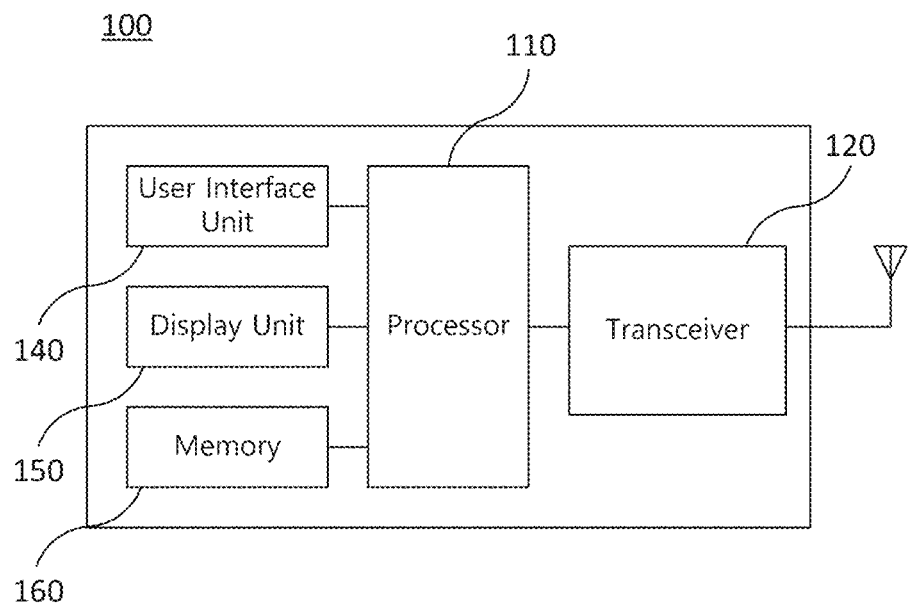
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
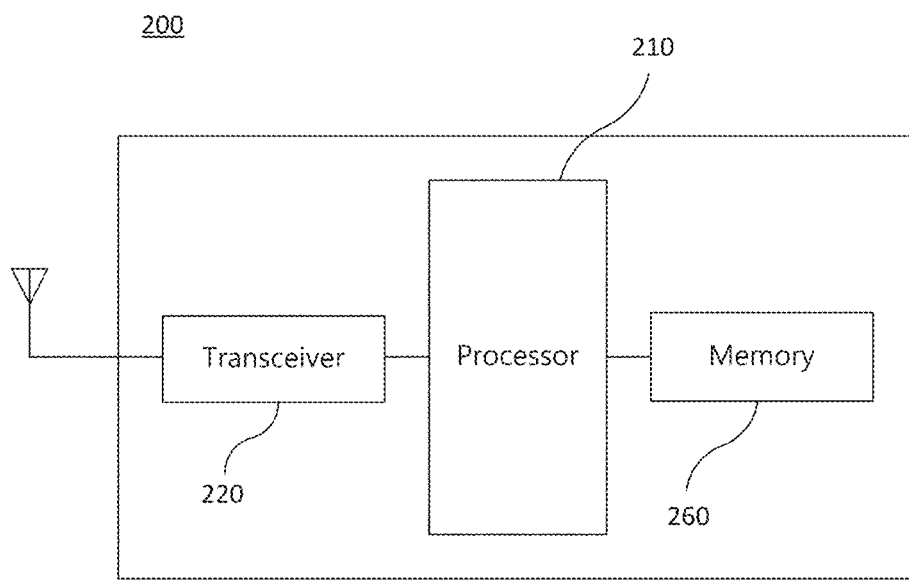
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
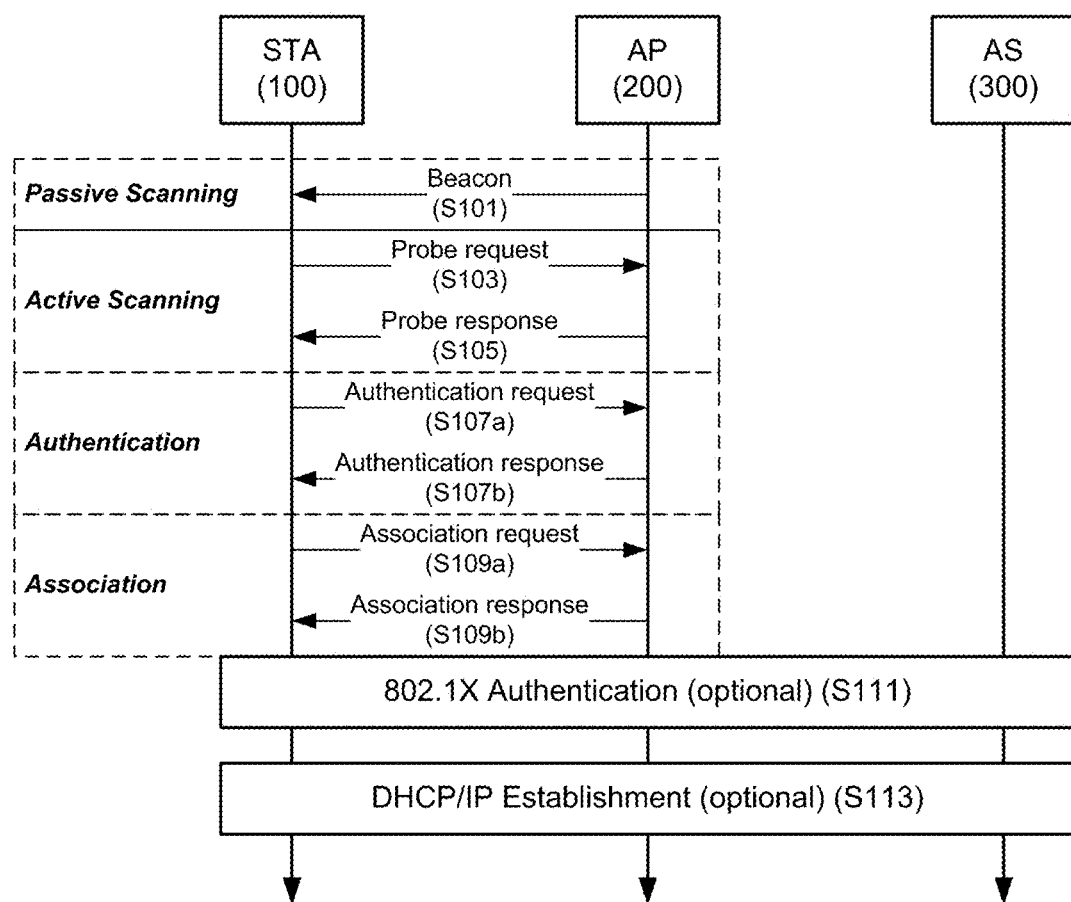
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

The base wireless communication terminal may be a wireless communication terminal that allocates and schedules medium resources in communication with a plurality of wireless communication terminals. Specifically, the base wireless communication terminal may serve as a cell coordinator. In a specific embodiment, the base wireless communication terminal may be a wireless communication terminal that allocates and schedules communication medium resources in an independent network, such as an ad-hoc network, that is not connected to an external distribution service.

The wireless communication terminal may use a Network Allocation Vector (NAV), which is an indicator indicating a time interval during which transmission is not allowed, in order to avoid collision with the transmission of other wireless communication terminals. When NAV is not 0, the wireless communication terminal may determine that the corresponding wireless medium is busy. In addition, when the NAV is 0, the wireless communication terminal may determine that the corresponding wireless medium is idle. In this way, it is referred to as virtual channel sensing (CS) that the wireless communication terminal determines whether the corresponding wireless medium may be idle according to the value of the NAV. Specifically, the NAV may be maintained regardless of the clear channel assessment (CCA) result of the wireless communication terminal. For example, when NAV of the wireless communication terminal is set, regardless of the CCA results for the corresponding wireless medium, transmission through the corresponding wireless medium of the wireless communication terminal may not be allowed. Also, when the corresponding wireless medium is idle in the virtual CS and is busy based on the CCA result, transmission through the corresponding wireless medium of the wireless communication terminal may not be allowed.

When the wireless communication terminal obtains a valid frame from the Physical Service Data Unit (PSDU), the wireless communication terminal may update the NAV according to the valid duration information indicated by the PSDU. Specifically, when the wireless communication terminal is solicited in an immediate response to a Physical layer Protocol Data Unit (PPDU) carrying the corresponding frame, the wireless communication terminal may not update the NAV. At this time, the immediate response may indicate a response transmitted within a predetermined time from when the PPDU receives the PPDU in the TXOP during which the PPDU is transmitted. The predetermined time may be a Short Inter-Frame Space (SIFS).

In addition, when the wireless communication terminal receives the DMG CTS frame and the receiver address of the corresponding CTS frame indicates the wireless communication terminal, the wireless communication terminal may not update the NAV. In other than the two cases described above, when the value of the DURATION field of the frame received by the wireless communication terminal is larger than the value of the current NAV, the wireless communication terminal may update the NAV according to the value of the DURATION field of the received frame.

When the PSDU includes the DURATION field, the wireless communication terminal may obtain duration information from the DURATION field to set the NAV. In addition, when the wireless communication terminal receives the Power Save (PS)-Poll frame, the wireless communication terminal may set the NAV using a sum of time required for one ACK frame transmission and SIFS. At this time, the wireless communication terminal may use time in microseconds. The wireless communication terminal may determine the time required for ACK frame transmission according to a data rate selection rule. In this case, when the decimal point value in microseconds of the sum of the time required for ACK frame transmission and SIFS is not 0, the wireless communication terminal may set the NAV by rounding up the sum of the time required for ACK frame transmission and the SIFS to the nearest integer value.

In a specific embodiment, when all of the following conditions are met, the wireless communication terminal may update the NAV according to the duration information indicated by TXOP_DURATION, which is a parameter of RXVECTOR.

The value of TXOP_DURATION, which is a parameter of RXVECTOR, is specified.

The wireless communication terminal does not receive a frame with the duration indicated by the DURATION field in the PPDU with TXOP_DURATION, which is a parameter of the RXVECTOR.

The value indicated by TXOP_DURATION, which is a parameter of the RXVECTOR, is greater than the value of the current NAV.

The PPDU carrying the TXOP_DURATION, which is a parameter of the RXVECTOR, is not a trigger-based PPDU triggered by the wireless communication terminal.

At this time, the RXVECTOR indicates information transmitted from the physical layer to the Medium Access Control (MAC) layer by the wireless communication terminal. In addition, when the wireless communication terminal receives the header of the valid PPDU, the wireless communication terminal may transmit the RXVECTOR from the physical layer to the MAC layer. At this time, the wireless communication terminal may transmit a PPDU reception start indicator to be described in the following embodiments. In addition, when all the bits of the TXOP_DURATION field are 1, the wireless communication terminal may determine that the value of the TXOP_DURATION field is not specified.

A wireless communication terminal is frequently communicating in a dense environment. Particularly, the number of cases where a wireless communication terminal communicates in an environment in which a plurality of BSSs are overlapped is increasing. When multiple BSSs are overlapped, the communication efficiency of the wireless communication terminal may be degraded due to interference with other wireless communication terminals. In particular, when a frequency band is used through a contention procedure, a wireless communication terminal may not obtain even a transmission opportunity due to interference with other wireless communication terminals. To solve this problem, a wireless communication terminal may perform a spatial reuse (SR) operation. Specifically, the SR operation may include an operation of accessing the channel depending on whether the received frame is a frame transmitted from a BSS including a wireless communication terminal or a frame transmitted from another BSS. In a specific embodiment, the operation of accessing the channel may include NAV setting, reset and update operations. For convenience of explanation, a BSS to which a wireless communication terminal belongs is referred to as Intra-BSS, and a basic service set overlapped with Intra-BSS is referred to as an Overlapped Basic Service Set (OBSS). In addition, the PPDU transmitted from the Intra-BSS is referred to as an Intra-BSS PPDU, and the frame transmitted from the OBSS is referred to as an OBSS PPDU or an Inter-BSS PPDU. In addition, a frame transmitted in the Intra-BSS is referred to as an Intra-BSS frame, and a frame transmitted in the OBSS is referred to as an OBSS frame or an Inter-BSS frame.

Specifically, the wireless communication terminal may change the NAV setting depending on whether the received frame is an Intra-BSS frame or an Inter-BSS frame. Specifically, the wireless communication terminal may separately maintain the NAV for the Intra-BSS frame and the NAV for the Inter-BSS frame. At this time, when the wireless communication terminal receives the Intra-BSS frame, the wireless communication terminal may set or update the NAV for the Intra-BSS frame based on the received Intra-BSS frame. In addition, when the frame received by the wireless communication terminal may not be determined as an Intra-BSS frame or an Inter-BSS frame, the wireless communication terminal may update the NAV for the Inter-BSS frame based on the received frame. In addition, when the wireless communication terminal receives the Inter-BSS frame, the wireless communication terminal may set or update the NAV for the Inter-BSS frame based on the received Inter-BSS frame. For convenience of explanation, NAV for Intra-BSS frame is referred to as Intra NAV and NAV for Inter-BSS frame is referred to as regular NAV.

When the wireless communication terminal uses the Intra NAV and the regular NAV, the wireless communication terminal may determine the following in the virtual CS. When the Intra NAV and Regular NAV are all 0, the wireless communication terminal may determine that the corresponding wireless medium is idle in the virtual CS. Also, when at least one of the Intra NAV and the Regular NAV is not 0, the wireless communication terminal may determine that the corresponding wireless medium is being used in the virtual CS.

In a specific embodiment, when all of the following conditions are met, the wireless communication terminal may update the Intra-BSS NAV according to the duration information indicated by the frame included in the PSDU.

The wireless communication terminal determines that the frame received by the wireless communication terminal is an Intra-BSS frame.

The duration information indicated by the frame received by the wireless communication terminal is greater than the current Intra-BSS NAV value.

The wireless communication terminal is not solicited to transmit an immediate response to the PPDU carrying the frame received by the wireless communication terminal.

In a specific embodiment, when all of the following conditions are met, the wireless communication terminal may update the regular NAV according to the duration information indicated by the frame included in the PSDU.

The wireless communication terminal determines that the frame received by the wireless communication terminal is an Inter-BSS frame.

The duration information indicated by the frame received by the wireless communication terminal is greater than the current Intra-BSS NAV value.

The wireless communication terminal is not solicited to transmit an immediate response to the PPDU carrying the frame received by the wireless communication terminal.

In a specific embodiment, when all of the following conditions are all met, the wireless communication terminal may update the Intra-BSS NAV with the duration information indicated by TXOP_DURATION, which is a parameter of RXVECTOR.

The value of TXOP_DURATION, which is a parameter of RXVECTOR, is specified.

The wireless communication terminal determines the PPDU carrying the TXOP_DURATION, which is a parameter of the RXVECTOR as the Intra-BSS PPDU.

The wireless communication terminal does not receive a frame with the duration indicated by the DURATION field in the PPDU with TXOP_DURATION, which is a parameter of the RXVECTOR.

The value indicated by TXOP_DURATION, which is a parameter of the RXVECTOR, is greater than the value of the current Intra-BSS NAV.

The PPDU carrying the TXOP_DURATION, which is a parameter of the RXVECTOR, is not a trigger-based PPDU triggered by the wireless communication terminal.

In a specific embodiment, when all of the following conditions are all met, the wireless communication terminal may update the regular NAV with the duration information indicated by TXOP_DURATION, which is a parameter of RXVECTOR.

The value of TXOP_DURATION, which is a parameter of RXVECTOR, is specified.

The wireless communication terminal determines the PPDU carrying TXOP_DURATION, which is a parameter of RXVECTOR, as Inter-BSS PPDU, or may not determine whether the PPDU carrying the TXOP_DURATION, which is a parameter of the RXVECTOR, is an Intra-BSS PPDU or an Inter-BSS PPDU.

The wireless communication terminal does not receive a frame with the duration indicated by the DURATION field in the PPDU with TXOP_DURATION, which is a parameter of the RXVECTOR.

The value indicated by TXOP_DURATION, which is a parameter of the RXVECTOR, is greater than the value of the current regular NAV.

When the PS-Poll frame is transmitted through the HE SU PPDU, the HE extended range SU PPDU, or the HE MU PPDU, TXOP_DURATION, which is the RXVECTOR parameter of the PPDU carrying the PS-Poll frame may not indicate the duration information.

When the wireless communication terminal obtains the duration information from the DURATION field of the PSDU and obtains the duration information indicated by the RXVECTOR parameter TXOP_DURATION, the wireless communication terminal may ignore the duration information indicated by the TXOP_DURATION, which is a parameter of RXVECTOR.

When the wireless communication terminal resets any one of the Intra-BSS NAV and the regular NAV in the case where the value of the other NAV is 0, the wireless communication terminal may initialize the reception state of the physical layer. Specifically, when the wireless communication terminal resets any one of the Intra-BSS NAV and the regular NAV in the case where the value of the other NAV is 0, the wireless communication terminal may issue a PHY-CCA-RESET.request primitive to a physical layer from the MAC layer.

Figure 6:
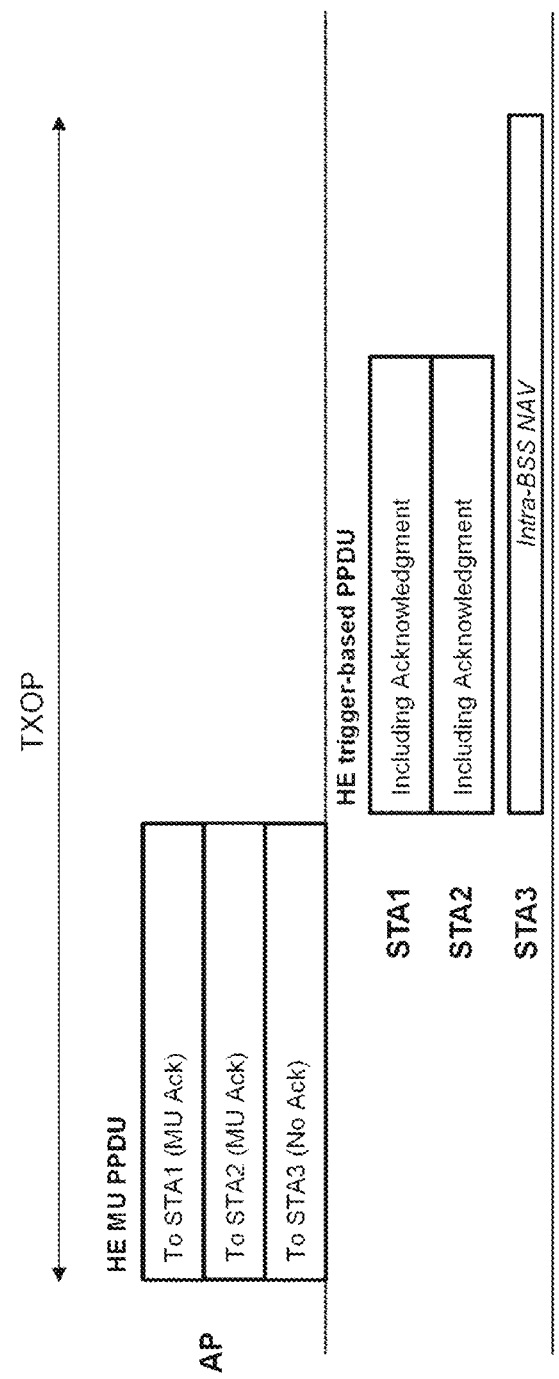
FIG. 6 shows that a wireless communication terminal according to an embodiment of the present invention sets a NAV according to an immediate response request.

FIG. 6 shows that a wireless communication terminal according to an embodiment of the present invention sets a NAV according to an immediate response request.

The wireless communication terminal may set the NAV according to whether the intended recipient of the frame received by the wireless communication terminal is a wireless communication terminal. Specifically, when the intended recipient of the frame received by the wireless communication terminal is not a wireless communication terminal, the wireless communication terminal may set the NAV according to the received frame. In this case, the wireless communication terminal may determine whether the intended recipient of the received frame is a wireless communication terminal based on whether at least one of the Receiver Address (RA) field, the User Info field, and the AID subfield of the frame indicates the wireless communication terminal.

In addition, the wireless communication terminal may set the NAV according to whether the frame received by the wireless communication terminal requires an immediate response. Specifically, when the frame received by the wireless communication terminal requires an immediate response, the wireless communication terminal may not set the NAV according to the received frame. Also, when the frame received by the wireless communication terminal does not require an immediate response and other conditions for NAV setting are met, the wireless communication terminal may set the NAV according to the received frame. The wireless communication terminal may determine whether a frame requires an immediate response according to at least one of a type of frame, a subtype, and an ACK Policy subfield.

In the embodiment of FIG. 6, the AP transmits a Multi-User (HE MU) PPDU in the first station STA1 to the third station STA3. At this time, the AP transmits a frame requiring ACK to each of the first station STA1 and the second station STA2. In addition, the AP transmits a frame that does not require an ACK to the third station STA3. The first station STA1 and the second station STA2 transmit an ACK to the AP through a trigger-based PPDU. At this time, the third station STA3 sets the Intra-BSS NAV.

FIG. 7 shows a trigger frame format according to an embodiment of the present invention.

The wireless communication terminal may trigger transmission of one or more wireless communication terminals by transmitting a trigger frame. Specifically, the wireless communication terminal transmits a trigger frame to trigger an Uplink (UL) MU transmission to a wireless communication terminal that receives the trigger frame. The wireless communication terminal that receives the trigger frame may perform UL MU transmission using the trigger-based PPDU. The trigger frame may include the information required to transmit the trigger-based PPDU.

The trigger frame may include a Frame Control field indicating information on frame control. In addition, the trigger frame may include a DURATION field indicating duration information for NAV setting. In addition, the trigger frame may include an RA field indicating the receiver address. In addition, the trigger frame may include a TA field indicating the transmitter address. Also, the trigger frame may include a Common Info field indicating information that is commonly applied to at least one wireless communication terminal where the trigger frame triggers the uplink transmission. In addition, the trigger frame may include a User Info field indicating information applied to each of at least one wireless communication terminal where the trigger frame triggers the uplink transmission. In addition, the trigger frame may include a Padding field that includes a padding bit. In addition, the trigger frame may include an FCS field for confirming whether or not the trigger frame includes an error bit. Specifically, the format of the trigger frame may be the same as that shown in FIG. 7(a).

The Common Info field may include a Trigger Type field indicating the type of the trigger frame. Further, the Common Info field may include a Length field indicating the length of the trigger frame. In addition, the Common Info field may include a Cascade Indication field indicating whether continues cascading transmission progresses in the trigger frame. In addition, the Common Info field may include a CS Required field that indicates whether a CS is required when transmitting a response to the trigger frame. At this time, the response to the trigger frame may be a trigger-based PPDU. Further, the Common Info field may include a BW field indicating information on a frequency band for transmitting a response to the trigger frame. In addition, the Common Info field may include a GI and LTF Type field indicating information on the GI and LTF used to transmit the response to the trigger frame. In addition, the Common Info field may include a GI and LTF Type field indicating information on the GI and LTF used to transmit the response to the trigger frame. In addition, the Common Info field may include a Number of HE-LTF Symbols field indicating the number of LTF symbols used to transmit the response to the trigger frame. Also, the Common Info field may include an STBC field indicating whether to use STBC to transmit the response to the trigger frame. In addition, the Common Info field may include an LDPC Extra Symbol field indicating whether to use an LDPC additional symbol to transmit the response to the trigger frame. Also, the Common Info field may include an AP Tx Power field indicating the transmission power used to transmit the trigger frame. In addition, the Common Info field may include a Packet Extension field indicating a duration of a packet extension part used to transmit a response to the trigger frame. In addition, the Common Info field may include a Spatial Reuse field indicating the value of the SR field of the HE SIG-A field of the PPDU used to transmit the response to the trigger frame. In addition, the Common Info field may include a Doppler field indicating whether a Doppler effect is applied to the transmission of a response to the trigger frame. Also, the Common Info field may include a Trigger Dependent Common Info subfield, which is determined according to the type of the trigger frame.

As described above, the trigger frame may include a CS Required field that indicates whether the CS is required when transmitting a response to the trigger frame. When the CS Required field requires the wireless communication terminal to consider the CS result when determining whether to respond to the trigger frame, the wireless communication terminal indicated by the User Info field of the trigger frame performs the CS when transmitting the trigger-based PPDU based on the trigger frame. In this case, the CS includes a virtual CS and a physical CS. Also, the physical CS may indicate energy detection (ED). Specifically, the ED may include a CCA. When the corresponding channel is busy based on a CS result, the wireless communication terminal does not transmit the trigger-based PPDU. When the corresponding channel is idle based on a CS result, the wireless communication terminal may transmit the trigger-based PPDU. When the wireless communication terminal determines that the NAV is not set and the corresponding channel is idle through the ED, the wireless communication terminal may determine that the corresponding channel is idle. When the CS Required field does not require the wireless communication terminal to consider the CS result when determining whether to respond to the trigger frame, the wireless communication terminal may transmit the trigger-based PPDU based on the trigger frame without CS. At this time, the wireless communication terminal that transmits the trigger-based PPDU is a wireless communication terminal indicated by the User Info field of the trigger frame.

FIG. 8 shows a case where a wireless communication terminal that receives a trigger frame fails to transmit a trigger-based PPDU based on a CS result according to an embodiment of the present invention.

As described above, the wireless communication terminal that is requested an immediate response to the frame does not update the NAV. However, when the CS Required field requires the CS to consider the CS result when the wireless communication terminal determines whether to respond to the trigger frame, the wireless communication terminal indicated by the User Info field of the trigger frame performs the CS when transmitting the trigger-based PPDU based on the trigger frame. At this time, when the CS result indicates that the channel to transmit the trigger-based PPDU is busy, the wireless communication terminal may not transmit the trigger-based PPDU. Therefore, even a wireless communication terminal that receives a request for an immediate response to a frame may not transmit an immediate response according to the value of the CS Required field of the trigger frame. The wireless communication terminal that receives a request for the immediate response did not transmit the immediate response but the NAV is not set. Therefore, channel access fairness between wireless communication terminals may be violated. In addition, the wireless communication terminal that receives a request for the immediate response may interfere with transmission of the trigger-based PPDU of another wireless communication terminal that together receives a request for an immediate response.

In the embodiment of FIGS. 8(a) and 8(b), the AP transmits a trigger frame to the first station STA1 to the third station STA3. At this time, the CS required field of the trigger frame requires to consider the CS result when determining the transmission of the trigger-based PPDU based on the trigger frame. The first station STA1 to the third station STA3 perform the CS before transmitting the trigger-based PPDU based on the trigger frame. At this time, the first station STA1 to the second station STA2 determine that the channel to be used for transmitting the trigger-based PPDU is idle. The fifth station STA5 adjacent to the third station STA3 is using the channel allocated to the third station STA3. Therefore, the third station STA3 determines that the channel to be used for transmitting the trigger-based PPDU is busy. Therefore, the first station STA1 to the second station STA2 transmit the trigger-based PPDU, and the third station STA3 fails to transmit the trigger-based PPDU. At this time, since the first to third stations STA1 to STA3 receive a request for an immediate response, the first to third stations STA1 to STA3 do not update the NAV based on the trigger frame. The fourth station STA4, which is not indicated by the trigger frame, updates the NAV based on the trigger frame.

The third station STA3 of which NAV is not set may perform the CCA again and attempt transmission while the first station STA1 to the second station STA2 perform the trigger based PPDU. Therefore, the transmission of the trigger-based PPDUs of the first station STA1 to the second station STA2 may be interrupted due to the transmission of the third station STA3. In addition, since the NAV is set, the fourth station STA4 may not access the channel so that the channel access opportunity may be disadvantageous in comparison with the third station STA3. Therefore, there is a need for an NAV setting method that may solve this problem. This will be described with reference to FIGS. 9 to 10.

FIG. 9 shows an operation in which a wireless communication terminal updates a NAV according to another embodiment of the present invention.

When the wireless communication terminal that receives a request for an immediate response to the frame fails to transmit an immediate response to the frame due to the CS result, the wireless communication terminal may update the NAV based on the frame or the PPDU including the frame. Specifically, the wireless communication terminal receives the trigger frame and requests the CS result to be considered when the trigger frame determines the trigger-based PPDU transmission, and the wireless communication terminal may not transmit the trigger-based PPDU due to the CS result. At this time, the wireless communication terminal may update the NAV based on the trigger frame or the PPDU including the trigger frame. When the wireless communication terminal determines that the channel is idle through the CS, the wireless communication terminal may transmit the trigger-based PPDU. At this time, since the wireless communication terminal receives a request for an immediate response and determines to transmit the trigger-based PPDU according to the CS result, the wireless communication terminal may not update the NAV. Also, when a trigger frame is received and it is not required to consider the CS result when the trigger frame determines the trigger-based PPDU transmission, the wireless communication terminal may not update the NAV because the wireless communication transmits the trigger-based PPDU without performing the CS.

In the embodiment of FIGS. 9(a) and 9(b), the AP transmits a trigger frame to the first station STA1 to the third station STA3. At this time, the CS required field of the trigger frame requires to consider the CS result when determining the transmission of the trigger-based PPDU based on the trigger frame. The first station STA1 to the third station STA3 perform the CS before transmitting the trigger-based PPDU based on the trigger frame. At this time, the first station STA1 to the second station STA2 determine that the channel to be used for transmitting the trigger-based PPDU is idle. In addition, the fifth station STA5 adjacent to the third station STA3 is using the channel allocated to the third station STA3. Therefore, the third station STA3 determines that the channel to be used for transmitting the trigger-based PPDU is busy. As a result, the first station STA1 to the second station STA2 transmit the trigger-based PPDU, and the third station STA3 fails to transmit the trigger-based PPDU. At this time, since the first to third stations STA1 to STA3 receive a request for an immediate response, they do not update the NAV based on the trigger frame or the PPDU including the trigger frame. However, since the third station STA3 fails to transmit the trigger-based PPDU, the third station STA3 updates the NAV based on the trigger frame or the PPDU including the trigger frame. The fourth station STA4, which is not indicated by the trigger frame, updates the NAV based on the trigger frame or the PPDU including the trigger frame.

FIG. 10 shows an operation in which a wireless communication terminal updates a NAV according to another embodiment of the present invention.

The wireless communication terminal that receives the trigger frame may update the NAV based on the trigger frame. At this time, when the NAV of the wireless communication terminal is set by the Intra-BSS frame, the wireless communication terminal may transmit the trigger-based PPDU regardless of the value of the NAV. Further, the wireless communication terminal may update the NAV based on the trigger frame regardless of whether the uplink transmission of the wireless communication terminal is triggered by the trigger frame. In this embodiment, even when the trigger frame requires an immediate response, the wireless communication terminal that receives the trigger frame may update the NAV based on the trigger frame.

Specifically, the wireless communication terminal that receives the Intra-BSS trigger frame may update the Intra-BSS NAV based on the trigger frame. In a specific embodiment, the wireless communication terminal may update the Intra-BSS NAV based on the frame when all of the following conditions are met.
  The wireless communication terminal determines that the frame received by the wireless communication terminal is an Intra-BSS frame.
  The duration information indicated by the frame received by the wireless communication terminal is greater than the current Intra-BSS NAV value.
  The wireless communication terminal is not solicited to transmit an immediate response to the PPDU carrying the frame received by the wireless communication terminal or the frame received by the wireless communication terminal is a trigger frame.

Further, the wireless communication terminal that receives the Inter-BSS trigger frame may update the regular NAV based on the trigger frame. The wireless communication terminal may update the regular NAV based on the frame when all of the following conditions are met.
  The wireless communication terminal determines that the frame received by the wireless communication terminal is an Inter-BSS frame or is not able to determine whether the received frame is an Inter-BSS frame or an Intra-BSS frame.
  The duration information indicated by the frame received by the wireless communication terminal is greater than the current Inter-BSS NAV value.
  The wireless communication terminal is not solicited to transmit an immediate response to the PPDU carrying the frame received by the wireless communication terminal or the frame received by the wireless communication terminal is a trigger frame.

In the embodiment of FIGS. 10(a) and 10(b), the AP transmits a trigger frame to the first station STA1 to the third station STA3. At this time, the CS required field of the trigger frame requires to consider the CS result when determining the transmission of the trigger-based PPDU based on the trigger frame. Since the first to third stations STA1 to STA3 receive a request for an immediate response but have received the trigger frame, they update the NAV based on the trigger frame. The first station STA1 to the third station STA3 perform the CS before transmitting the trigger-based PPDU based on the trigger frame. At this time, the first station STA1 to the second station STA2 determine that the channel to be used for transmitting the trigger-based PPDU is idle. In particular, the first station STA1 to the second station STA2 do not consider the NAV set by the Intra-BSS frame. In addition, the fifth station STA5 adjacent to the third station STA3 is using the channel allocated to the third station STA3. Therefore, the third station STA3 determines that the channel to be used for transmitting the trigger-based PPDU is busy. As a result, the first station STA1 to the second station STA2 transmit the trigger-based PPDU, and the third station STA3 fails to transmit the trigger-based PPDU. The fourth station STA4 updates the NAV based on the trigger frame or the PPDU including the trigger frame.

In another embodiment, the wireless communication terminal may modify the method of determining whether an immediate response other than a NAV update condition is requested. This will be described with reference to FIGS. 11 to 12.

Figure 11:
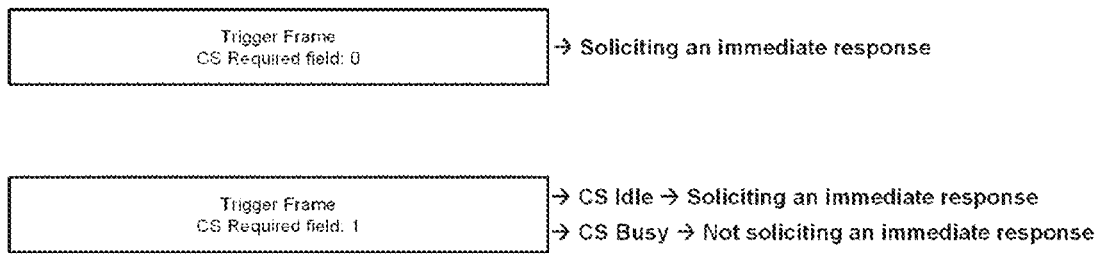
FIGS. 11 to 12 illustrate a method of a wireless communication terminal according to an embodiment of the present invention to determine whether an immediate response to a trigger frame is required based on a CS required field.
Figure 12:
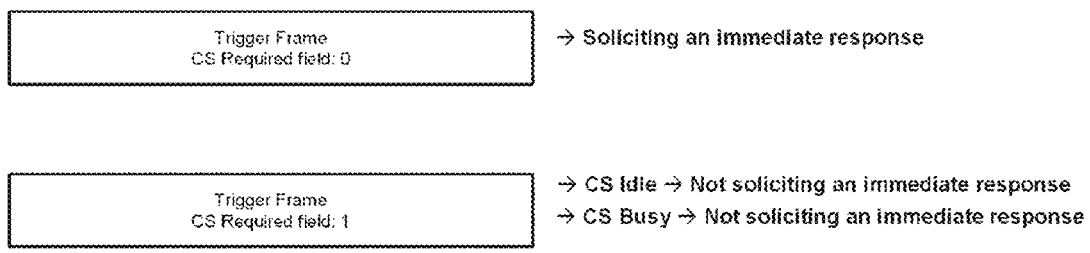

FIGS. 11 to 12 illustrate a method of a wireless communication terminal according to an embodiment of the present invention to determine whether an immediate response to a trigger frame is required based on a CS required field.

When the CS required field does not require to consider the CS result when determining the transmission of a trigger-based PPDU based on a trigger frame, the wireless communication terminal may determine that an immediate response to the trigger frame is required. In a specific embodiment, when the CS required field requires to consider the CS result when determining the transmission of a trigger-based PPDU based on a trigger frame, the wireless communication terminal may determine that an immediate response to the trigger frame is required according to the CS result. Specifically, when it is not determined that channel is idle based on the CS result, the wireless communication terminal may determine that an immediate response to the trigger frame is not required. In addition, when it is determined that the channel is idle based on the CS result, the wireless communication terminal may determine that an immediate response to the trigger frame is required. Specifically, the wireless communication terminal may make a determination as in FIG. 11.

In another specific embodiment, when the CS required field requires to consider the CS result when determining the transmission of a trigger-based PPDU based on a trigger frame, the wireless communication terminal may determine that an immediate response to the trigger frame is not required. At this time, the wireless communication terminal may transmit the trigger-based PPDU regardless of the NAV set by the Inter-BSS frame. Specifically, the wireless communication terminal may make a determination as in FIG. 12.

Through FIGS. 13 to 18, operation time points related to the NAV setting of the wireless communication terminal will be described.

Figure 13:
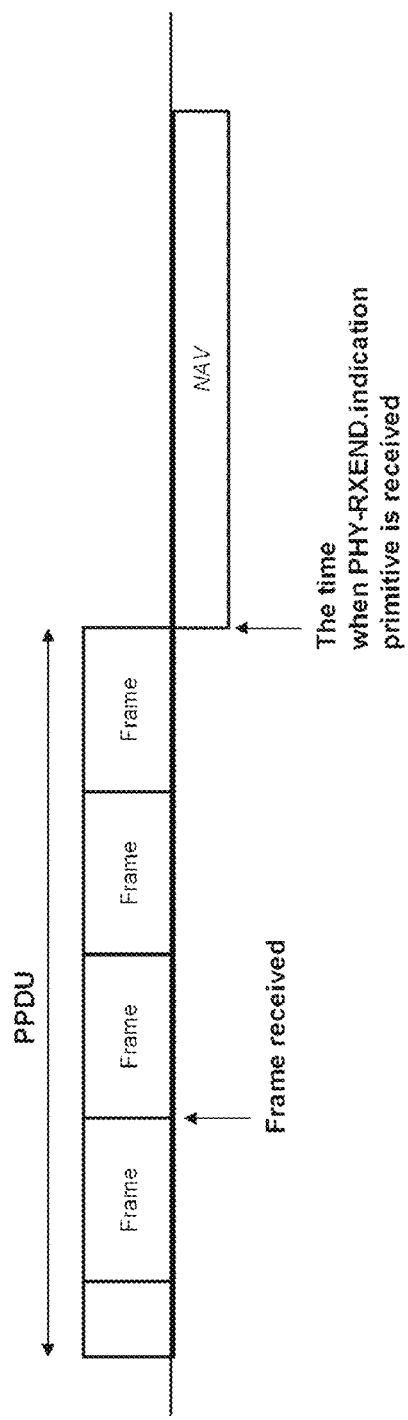
FIGS. 13 to 14 show time points for setting the NAV of a wireless communication terminal according to an embodiment of the present invention.
Figure 14:
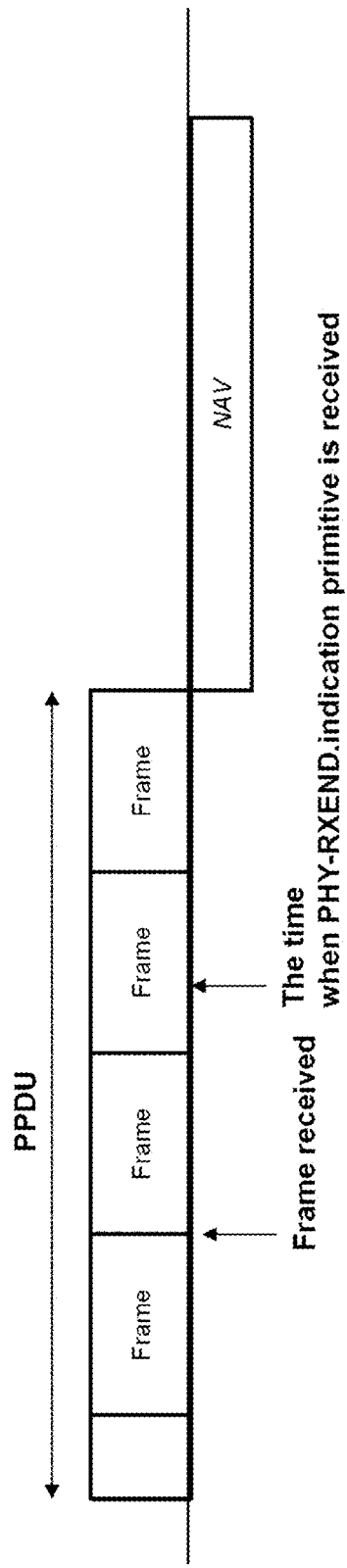

FIGS. 13 to 14 show time points for setting the NAV of a wireless communication terminal according to an embodiment of the present invention.

When the MAC layer receives a PPDU reception end indicator indicating the end of PPDU reception from the physical layer, the wireless communication terminal may update the NAV. At this time, the PPDU reception end indicator may be a PHY-RXEND.indication primitive. In an embodiment of FIG. 13, the MAC sublayer management entity (MLME) of the wireless communication terminal receives the PHY-RXEND.indication primitive from the physical layer when the reception of the PPDU ends. The MLME of the wireless communication terminal sets the NAV when receiving the PHY-RXEND.indication primitive.

When the wireless communication terminal receives the PPDU reception end indicator before the PPDU reception end time point, the wireless communication terminal may update the NAV at a time point expected to be the PPDU reception end time point. In the embodiment of FIG. 14, the wireless communication terminal fails to receive the PPDU. Therefore, the physical layer management entity (PLME) of the wireless communication terminal delivers the PHY-RXEND.indication primitive to the MAC layer earlier than the scheduled time point of the PPDU reception end. At this time, the MLME of the wireless communication terminal updates the NAV at the scheduled time point of the PPDU reception end, not the received time point of the PHY-RXEND.indication primitive.

The wireless communication terminal may operate in such a manner not only when using one NAV but also when using Intra-BSS NAV and regular NAV. In addition, the wireless communication terminal may operate in such a manner not only when the duration information is obtained from the frame but also when the duration information is obtained from the signaling field of the PPDU.

Figure 15:
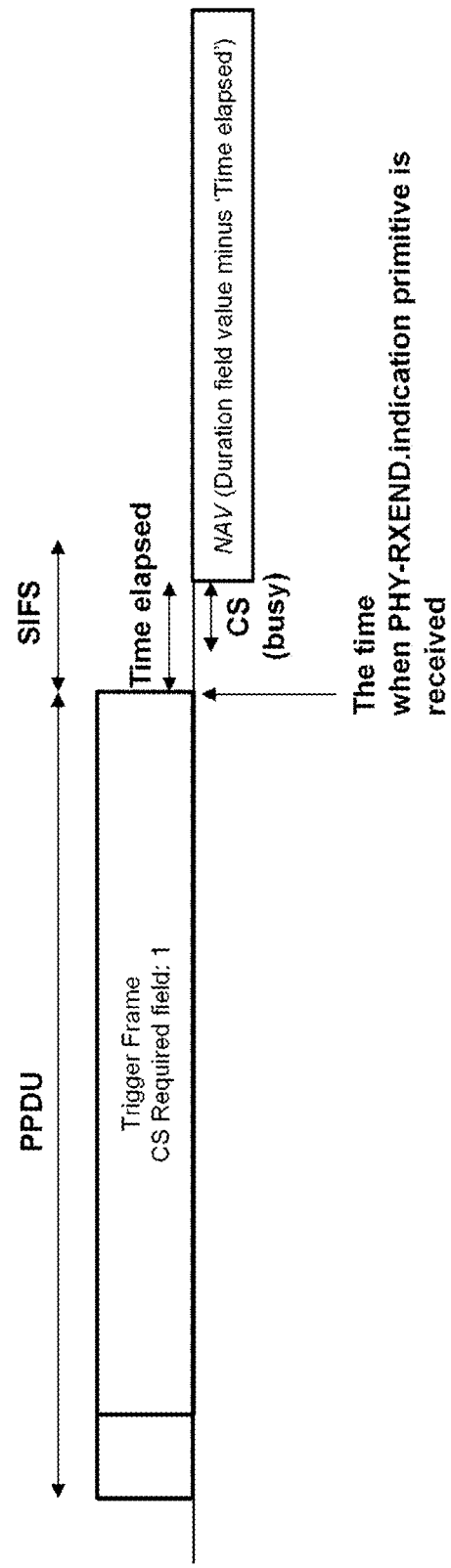
FIGS. 15 to 16 show time points at which the wireless communication terminal sets the NAV when the wireless communication terminal according to an embodiment of the present invention updates the NAV based on the result of CS required for transmission of the trigger-based PPDU.
Figure 16:
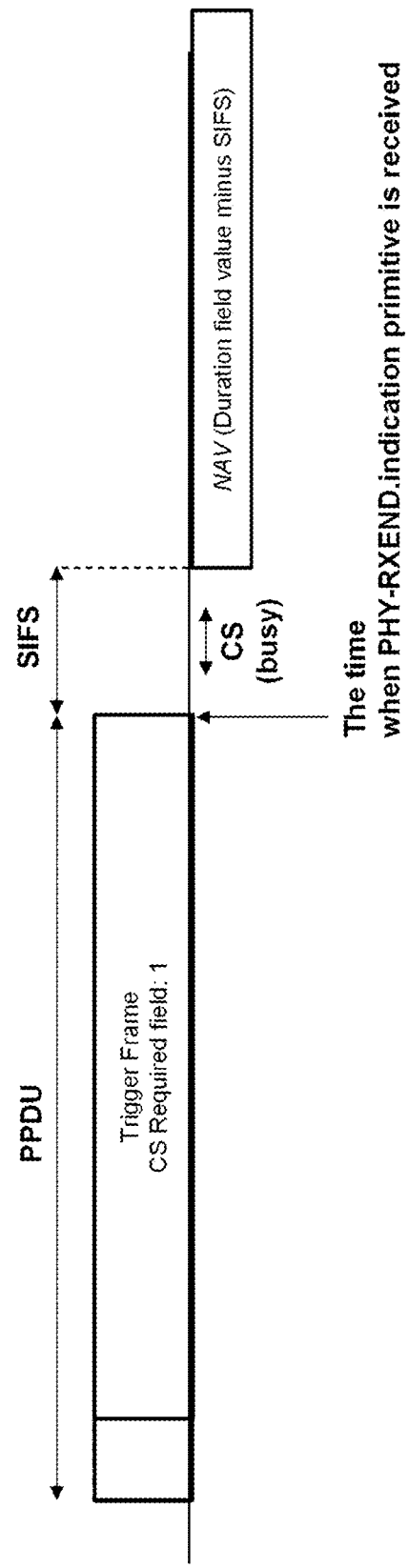

FIGS. 15 to 16 show time points at which the wireless communication terminal sets the NAV when the wireless communication terminal according to an embodiment of the present invention updates the NAV based on the result of CS required for transmission of the trigger-based PPDU.

The wireless communication terminal may set the NAV according to the result of CS required for transmission of the trigger-based PPDU in the above-described embodiments. At this time, the CS of the wireless communication terminal takes a certain time. Specifically, the predetermined time may be an SIFS. Therefore, the wireless communication terminal may update the NAV after the CS required for trigger-based PPDU transmission. Specifically, the wireless communication terminal may update the NAV after the time from the reception of the PPDU reception end indicator to the end of the CS.

When the trigger frame received by the wireless communication terminal requests CS for trigger-based PPDU transmission, the wireless communication terminal may update the NAV according to the embodiment described above. Specifically, when the trigger frame CS required field received by the wireless communication terminal is 1, the wireless communication terminal may update the NAV according to the above-described embodiment. In addition, when the wireless communication terminal is a recipient intended by a trigger frame, the wireless communication terminal may update the NAV according to the embodiment described above. Alternatively, when the transmission of the wireless communication terminal is scheduled, the wireless communication terminal may update the NAV according to the embodiment described above.

In addition, the wireless communication terminal may update the time minus the time taken for CS in the duration information to the value of NAV. Further, the wireless communication terminal may obtain the duration information from the frame. In another specific embodiment, the wireless communication terminal may obtain duration information from the signaling field of the PPDU.

In the embodiment of FIG. 15, the wireless communication terminal updates the NAV when the time that the CS of the wireless communication terminal requires elapses from receiving the PHY-RXEND.indication primitive. At this time, the wireless communication terminal updates the value obtained by subtracting the time required for CS from the duration information to the value of NAV. In the embodiment of FIG. 16, the wireless communication terminal updates the NAV after then SIFS from when receiving the PHY-RXEND.indication primitive. At this time, the wireless communication terminal updates the value obtained by subtracting the SIFS from the duration information to the value of NAV.

Figure 17:
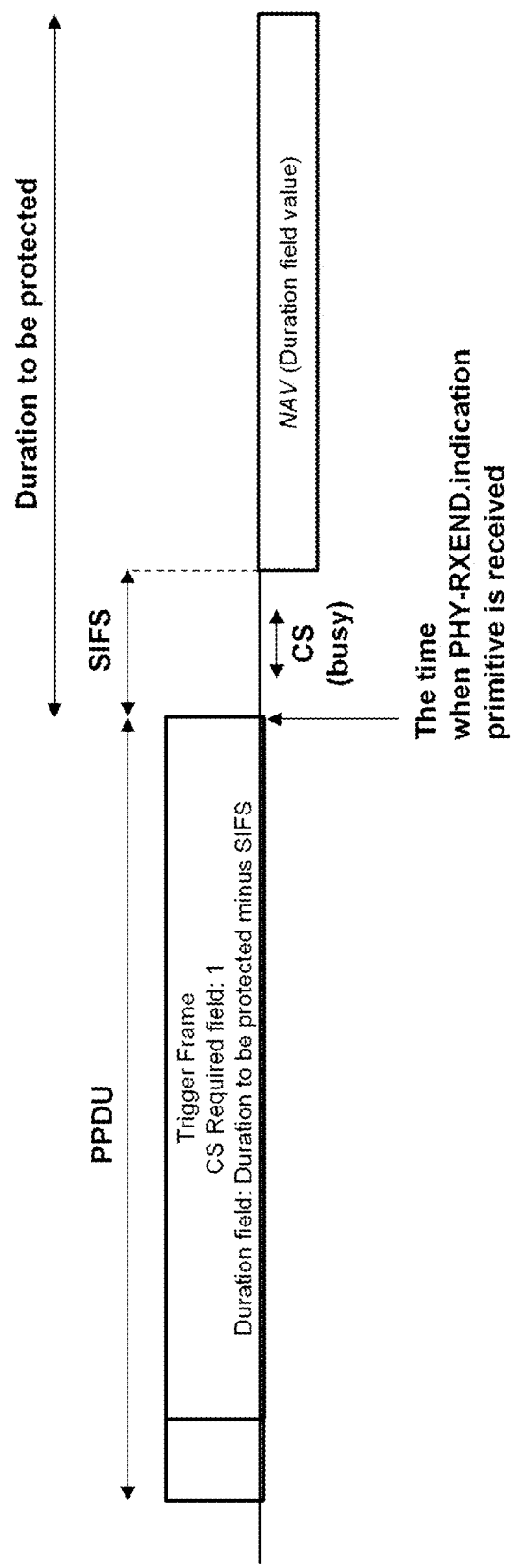
FIGS. 17 to 18 show time points at which the wireless communication terminal sets the NAV when the wireless communication terminal according to another embodiment of the present invention updates the NAV based on the result of CS required for transmission of the trigger-based PPDU.
Figure 18:
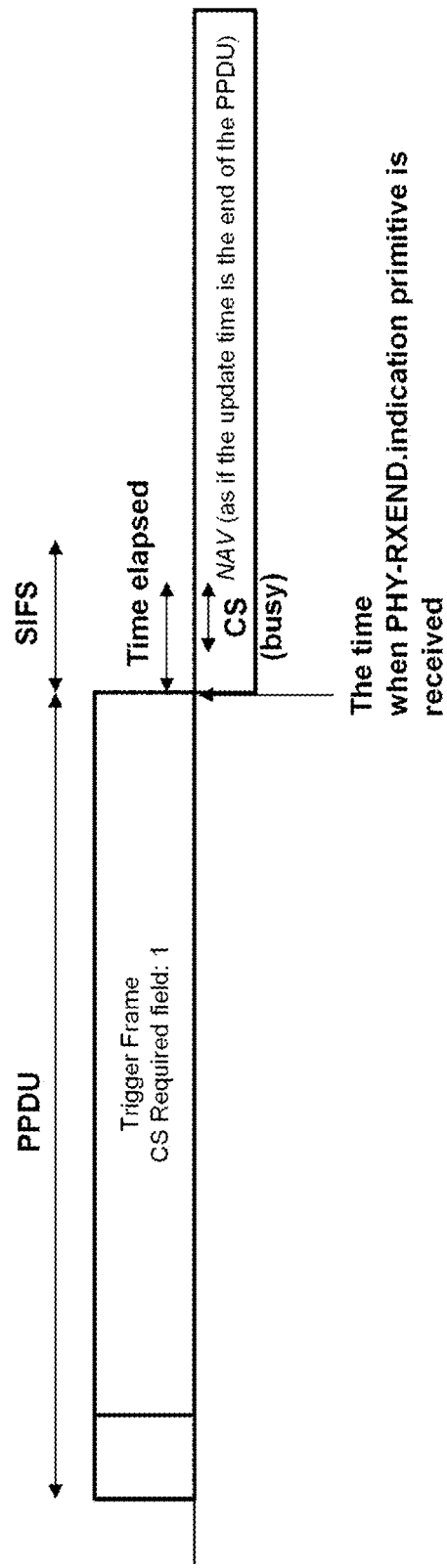

FIGS. 17 to 18 show time points at which the wireless communication terminal sets the NAV when the wireless communication terminal according to another embodiment of the present invention updates the NAV based on the result of CS required for trigger-based PPDU transmission.

In the embodiment described with reference to FIGS. 15 and 16, it is described that the wireless communication terminal may update the time obtained by subtracting the time required for the CS from the time indicated by the duration information to the value of the NAV. In particular, it is described that the time required for CS may be SIFS. In another specific embodiment, the wireless communication terminal that transmits the trigger frame may set the time indicated by the duration information to a time obtained by subtracting the time required for the CS from the time required for transmission protection. Specifically, the wireless communication terminal that transmits the trigger frame may set the DURATION field of the frame to a time obtained by subtracting the time required for the CS from the time required for transmission protection. Also, the wireless communication terminal that transmits the trigger frame may set the TXOP_DURATION field of the signaling field of the PPDU to a time obtained by subtracting the time required for the CS from the time required for transmission protection. At this time, the time required for the CS may be SIFS. The NAV update time point and other operations of the wireless communication terminal that receives the trigger frame may be the same as those in the embodiments described with reference to FIG. 15 to FIG. 16. In addition, the wireless communication terminal that receives the trigger frame may operate as when the time point for setting the NAV is the time point at which the information indicating the completion of PPDU reception is received.

In the embodiment of FIG. 17, the wireless communication terminal that transmits the trigger frame sets the CS required field to 1 and sets the duration information to a time obtained by subtracting the time required for the CS from the time required for transmission protection. The wireless communication terminal that receives the trigger frame updates the NAV based on the CS result. The wireless communication terminal that receives the trigger frame updates the NAV after SIFS from when receiving the PPDU. At this time, the wireless communication terminal that receives the trigger frame updates the time indicated by the duration information to the value of NAV. In the embodiment of FIG. 18, the operation of the wireless communication terminal that receives the trigger frame is the same as that of the embodiment of FIG. 17. However, the wireless communication terminal operates as when the time point for setting the NAV is the time point at which the information indicating the completion of PPDU reception is received.

In the embodiment described with reference to FIGS. 6 to 18, the wireless communication terminal may update the NAV based on the MAC header of the trigger frame. Specifically, the wireless communication terminal may update the NAV based on the Frame Control field of the MAC header, the Type of the Frame Control field, and the Subtype subfield. In addition, when the wireless communication terminal corresponds to a recipient intended by the trigger frame, the wireless communication terminal may update the NAV based on the trigger frame. At this time, the wireless communication terminal may determine whether the wireless communication terminal corresponds to a recipient intended by the trigger frame according to whether the User Info field of the trigger frame indicates the wireless communication terminal. Specifically, when the User Info field of the trigger frame indicates the wireless communication terminal, the wireless communication terminal may determine that the wireless communication terminal corresponds to the recipient intended by the trigger frame. In the specific embodiment, when the User Info field of the trigger frame indicates the Association ID (AID) of the wireless communication terminal, the wireless communication terminal may determine that the wireless communication terminal corresponds to a recipient intended by the trigger frame. At this time, the User Info field may indicate a part of the AID of the wireless communication terminal. For example, the User Info field may indicate 12 bits of Least Significant Bit (LSB) of the AID of the wireless communication terminal.

In addition, when the trigger frame triggers the wireless communication terminal belongs to the Inter-BSS, the wireless communication terminal may update the Inter-BSS NAV based on the trigger frame.

When the receiver address of the frame received by the wireless communication terminal is not a wireless communication terminal, the wireless communication terminal may update the NAV based on the received frame. When the trigger frame triggers the transmission of a plurality of wireless communication terminals, the wireless communication terminal that transmits the trigger frame may set the receiver address of the trigger frame as a broadcast address. Also, when the trigger frame triggers the transmission of any one of the wireless communication terminals, the wireless communication terminal that transmits the trigger frame may set the receiver address of the trigger frame to the address of any one of the wireless communication terminals. At this time, it may be a problem whether the wireless communication terminal that receives the trigger frame may set the NAV based on the trigger frame. When the wireless communication terminal that receives the trigger frame does not set the NAV based on the trigger frame, the problem described with reference to FIG. 8 may occur. Therefore, the wireless communication terminal that receives the trigger frame may set the NAV based on the trigger frame regardless of the receiver address of the trigger frame.

FIG. 19 shows a method of a wireless communication terminal to set a padding length of a trigger frame according to an embodiment of the present invention.

As described with reference to FIG. 7, the trigger frame may include a padding field. Specifically, a wireless communication terminal that transmits a trigger frame may insert a padding field into a trigger frame to help a wireless communication terminal that receives the trigger frame secure a time to process the trigger frame. At this time, the padding field may be a field having an octet length of 2 or more. Also, the beginning of the padding field may be indicated by a predetermined value. The predetermined value may be 0xFFF. Also, the remaining bits of the padding field may all be 1. The wireless communication terminal other than the base wireless communication terminal may transmit necessary padding length information, which is information related to the length of the padding field required for the base wireless communication terminal. The base wireless communication terminal may set the padding field of the trigger frame based on the necessary padding length information. The wireless communication terminal other than the base wireless communication terminal may be a non-AP wireless communication terminal. Specifically, a wireless communication terminal other than a base wireless communication terminal may transmit necessary padding length information to a base wireless communication terminal in an association procedure. For example, a wireless communication terminal other than a base wireless communication terminal may transmit necessary padding length information through at least one of a probe request frame and an association request frame. The necessary padding length information may indicate the duration of the padding field. For example, the necessary padding length information may indicate the duration of any one of 0 us, 8 us, and 16 us as in $m_{PAD}$ in FIGS. 18(a) and 18(b). In a specific embodiment, the base wireless communication terminal may set the length of a padding field of a trigger frame transmitted through any one of non-HT PPDU, HT PPDU, and VHT PPDU using the equation of FIG. 18(a). Also, the base wireless communication terminal may set the length of the padding field of the trigger frame transmitted through the HE PPDU using the equation of FIG. 18(b). In this case, $N_{DBPS}$ may indicate the maximum number of data bits per symbol, and $N_{DBPS}$, SHORT may indicate the number smaller than the number of data bits per symbol.

When the trigger frame triggers transmission of a plurality of wireless communication terminals, the wireless communication terminal may set the length of the padding field of the trigger frame based on the longest length of the padding field lengths required by the plurality of wireless communication terminals. Specifically, when the trigger frame triggers the transmission of a plurality of wireless communication terminals, the wireless communication terminal may set the length of the padding field of the trigger frame based on necessary padding length information indicating the longest duration among a plurality of necessary padding length information transmitted by the plurality of wireless communication terminals.

The trigger frame may trigger a random access of a wireless communication terminal associated with the base wireless communication terminal. Also, the trigger frame may trigger transmission of a wireless communication terminal that is unassociated with the base wireless communication terminal. Specifically, the base wireless communication terminal sets the User Info field of the trigger frame to a predetermined value to trigger a random access of an associated wireless communication terminal or a random access of an unassociated wireless communication terminal. At this time, there is a problem that the base wireless communication terminal sets the length of the padding field of the trigger frame.

When the trigger frame triggers a random access of the associated wireless communication terminal, the base wireless communication terminal may set the length of the padding field based on necessary padding length information indicating the longest length among necessary padding length information of the plurality of wireless communication terminals that receive the trigger frame. At this time, the plurality of wireless communication terminals that receive the trigger frame may be a plurality of wireless communication terminals that trigger the uplink transmission. Also, the plurality of wireless communication terminals that receive the trigger frame may be wireless communication terminals associated with the base wireless communication terminal that transmits the trigger frame. When the trigger frame triggers a random access of the unassociated wireless communication terminal, the base wireless communication terminal may set the length of the padding field based on the longest length of the necessary padding length information. For example, when triggering a random access of a wireless communication terminal in the embodiment of FIG. 18, the base wireless communication terminal may set m to 4.

When a valid PPDU is received, the wireless communication terminal may start processing for a frame included in the received PPDU. Specifically, when the wireless communication terminal receives the PPDU, the MLME of the wireless communication terminal receives a PPDU reception start indicator indicating that the physical layer starts to receive a valid PPDU. In a specific embodiment, after the MLME of the wireless communication terminal receives the PPDU reception start indicator, the MLME of the wireless communication terminal may receive the RXVECTOR described above from the physical layer. The wireless communication terminal may determine whether the wireless communication terminal starts to receive a valid PPDU based on whether the base wireless communication terminal receives the header of a valid PPDU. Specifically, the wireless communication terminal may determine that the base wireless communication terminal starts to receive a valid PPDU based on whether the base wireless communication terminal receives a valid PPDU format. The PPDU reception start indicator may be a PHY-RXSTART.indication primitive. Specifically, when the wireless communication terminal effectively receives the header of the PPDU, the wireless communication terminal may issue a PHY-RXSTART.indication primitive. In a specific embodiment, the wireless communication terminal may issue the PHY-RXSTART.indication primitive after receiving the signaling field of the PPDU. At this time, the signaling field may include an HT SIG field, a VHT SIG, and a HE SIG.

In addition, the wireless communication terminal may issue the PHY-RXSTART.indication primitive and may determine that the wireless medium through which the corresponding PPDU is transmitted is busy for the period indicated by the LENGTH field and the DATARATE field of the signaling field of the corresponding PPDU. After the wireless communication terminal issues the PHY-RXSTART.indication primitive, even when loss of PPDU reception or format violation occurs, the wireless communication terminal may determine that the wireless medium through which the PPDU is transmitted is busy. The loss of PPDU reception may indicate the issue of the PHY-RX-END.indication (CarrierLost) primitive. In addition, a format violation may also indicate the issue of the PHY-RXEND.indication (FormatViolation) primitive.

Further, after the MLME of the wireless communication terminal receives the PPDU reception start indicator, the MLME of the wireless communication terminal may process the frame included in the PPDU. Specifically, after the MLME of the wireless communication terminal receives the PPDU reception start indicator, the wireless communication terminal may perform operations related to the NAV and operations related to the frame. In a specific embodiment, the operation related to the NAV may include at least one of a NAV setting and a NAV reset. In addition, the operation related to the NAV may include setting the NAV based on the TXOP_DURATION obtained from the HE-SIG-A by the wireless communication terminal. The operations related to a frame may include at least one of frame reception and frame decoding. Therefore, when the PPDU reception start indicator is not issued, the wireless communication terminal may not perform the operation related to the NAV setting based on the PPDU.

FIGS. 20 to 23 show operations in which a wireless communication terminal according to an embodiment of the present invention receives a PPDU and issues a PHY-RXSTART.indication.

The primary channel indicates the frequency band commonly used by the wireless communication terminals included in the BSS. In particular, the primary channel may have a predetermined frequency bandwidth. The predetermined frequency bandwidth may be 20 MHz. Also, in this specification, a primary channel may indicate a primary channel of a BSS to which a wireless communication terminal belongs. Therefore, when MU transmission through OFDMA is not used, the wireless communication terminal may ignore PPDUs that are not received through the frequency band overlapping the primary channel. This is because it may be determined that the corresponding PPDU is not a PPDU transmitted to the wireless communication terminal. Also, the wireless communication terminal may associate a primary channel with a secondary channel when the primary channel is idle.

Figure 20:
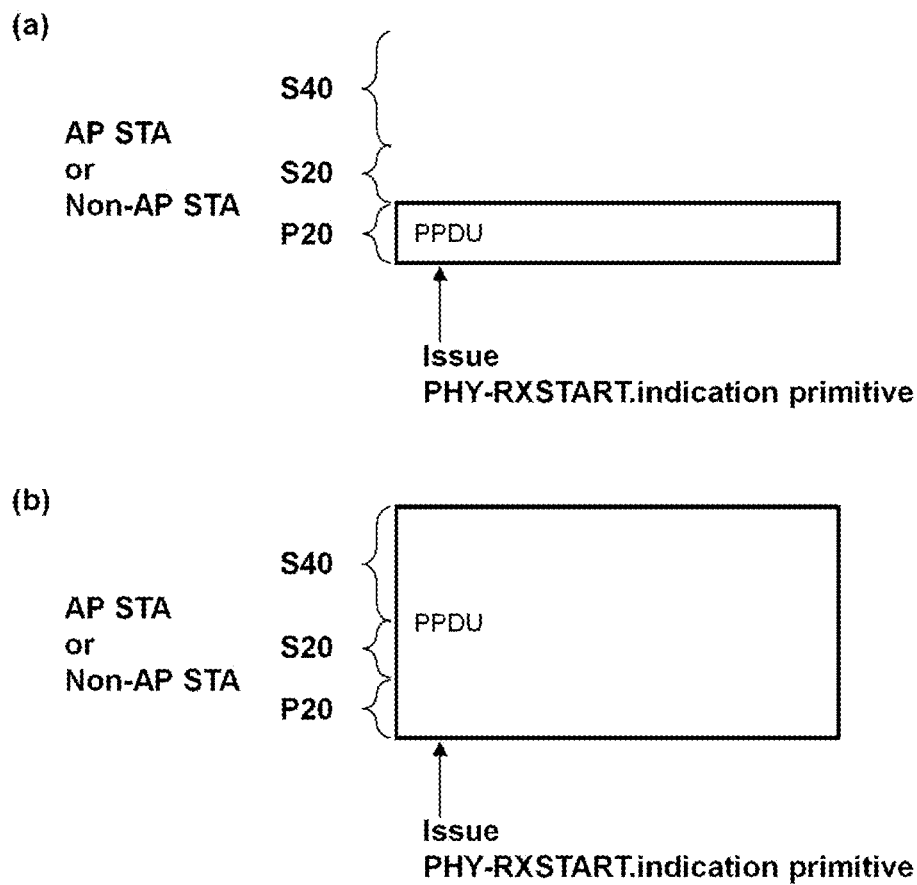
FIGS. 20 to 23 show operations in which a wireless communication terminal according to an embodiment of the present invention receives a PPDU and issues a PHY-RXSTART.indication.

In the embodiment of FIG. 20(*a*), the wireless communication terminal receives a PPDU through a primary channel having a bandwidth of 20 MHz. In the embodiment of FIG. 20(*b*), the wireless communication terminal receives the PPDU through the frequency bands P20, S20, and S40 including the primary channel P20 having the bandwidth of 20 MHz. In both embodiments of FIGS. 20(*a*) and 20(*b*), the wireless communication terminal receives the PPDU through a frequency band overlapped with the primary channel. Therefore, the wireless communication terminal determines whether the PPDU includes a valid signaling field. When the PPDU includes a valid signaling field, the wireless communication terminal issues the PHY-RXSTART.indication primitive.

When MU transmission using OFDMA is used, a PPDU using a base wireless communication terminal as a receiver may be received through a frequency band that does not overlap the primary channel Particularly, in the MU transmission using the OFDMA, the transmission through the primary channel may fail and the PPDU using the base wireless communication terminal as a receiver may be received through the secondary channel Therefore, even when the base wireless communication terminal receives the trigger-based PPDU through a frequency band other than a frequency band overlapped with the primary channel, the base wireless communication terminal may determine that a valid PPDU is received. When the base wireless communication terminal receives the trigger-based PPDU, the base wireless communication terminal may determine whether the base wireless communication terminal receives a valid PPDU regardless of the frequency band in which the trigger-based PPDU is transmitted. Specifically, when the base wireless communication terminal receives a PPDU through a frequency band that does not overlap with a primary channel and does not receive a trigger-based PPDU, the base wireless communication terminal may determine that the base wireless communication terminal receives an invalid PPDU. When the base wireless communication terminal receives a PPDU through a frequency band that does not overlap with a primary channel and does not receive a trigger-based PPDU, the base wireless communication terminal may not issue the PPDU reception start indicator.

In the embodiment of FIG. 21(a), the AP receives a PPDU other than an HE trigger-based PPDU through a secondary channel S20 other than the primary channel P20. In the embodiment of FIG. 21(b), the AP receives an HE trigger-based PPDU through the secondary channel S20 other than the primary channel P20. In the embodiment of FIG. 21(a), since the PPDU received by the AP is not a trigger-based PPDU, the AP determines that an invalid PPDU is received. The AP does not issue the PHY-RXSTART.indication primitive. In the embodiment of FIG. 21(b), since the PPDU received by the AP is a trigger-based PPDU, the AP determines that a valid PPDU is received. Thus, when the signaling field of the PPDU is valid, the AP issues the PHY-RXSTART.indication primitive.

When the wireless communication terminal other than the base wireless communication terminal receives the trigger-based PPDU, the wireless communication terminal may determines that the PPDU is not the PPDU transmitted to the wireless communication terminal. This is because the wireless communication terminal other than the base wireless communication terminal may not trigger the uplink transmission by transmitting the trigger frame. Therefore, a wireless communication terminal other than a base wireless communication terminal may ignore PPDUs not received through a frequency band overlapping a primary channel. Specifically, a wireless communication terminal other than a base wireless communication terminal may determine that a PPDU not received through the frequency band overlapping the primary channel is not a valid PPDU. Therefore, when a wireless communication terminal other than the base wireless communication terminal receives a PPDU not received through the frequency band overlapping the primary channel, the wireless communication terminal may not issue the PPDU reception start indicator.

Figure 22:
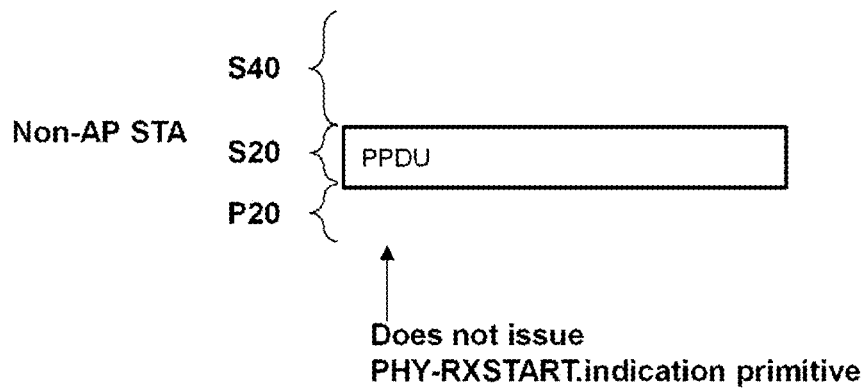

In the embodiment of FIG. 22, a non-AP station Non-AP STA receives an HE trigger-based PPDU through the secondary channel S20 other than the primary channel P20. Since the non-AP station Non-AP STA receives the PPDU through the frequency band S20 that does not overlap the primary channel P20, the non-AP station Non-AP STA determines that the non-AP station Non-AP STA receives an invalid PPDU. Therefore, the non-AP station Non-AP STA does not issue the PHY-RXSTART.indication primitive.

As described above, even when the base wireless communication terminal receives the trigger-based PPDU that is the Inter-BSS PPDU through the frequency band that does not overlap the primary channel, the base wireless communication terminal may determine whether reception of the trigger-based PPDU is valid. At this time, the base wireless communication terminal may update the regular NAV based on the trigger-based PPDU that is the Inter-BSS PPDU. In addition, when the base wireless communication terminal receives the trigger-based PPDU that is the Intra-BSS PPDU through the frequency band that does not overlap the primary channel, the base wireless communication terminal may determine whether reception of the trigger-based PPDU is valid. Therefore, the base wireless communication terminal may update the Intra-BSS NAV based on the trigger-based PPDU. In such embodiments, the base wireless communication terminal may determine whether the PPDU received by the base wireless communication terminal is an Inter-BSS PPDU or an Intra-BSS PPDU based on the BSS color indicated by the PPDU. Specifically, when the BSS color indicated by the PPDU received by the base wireless communication terminal is equal to the BSS color of the BSS operated by the base wireless communication terminal, the base wireless communication terminal may determine that the received PPDU is an Intra-BSS PPDU.

Figure 23:
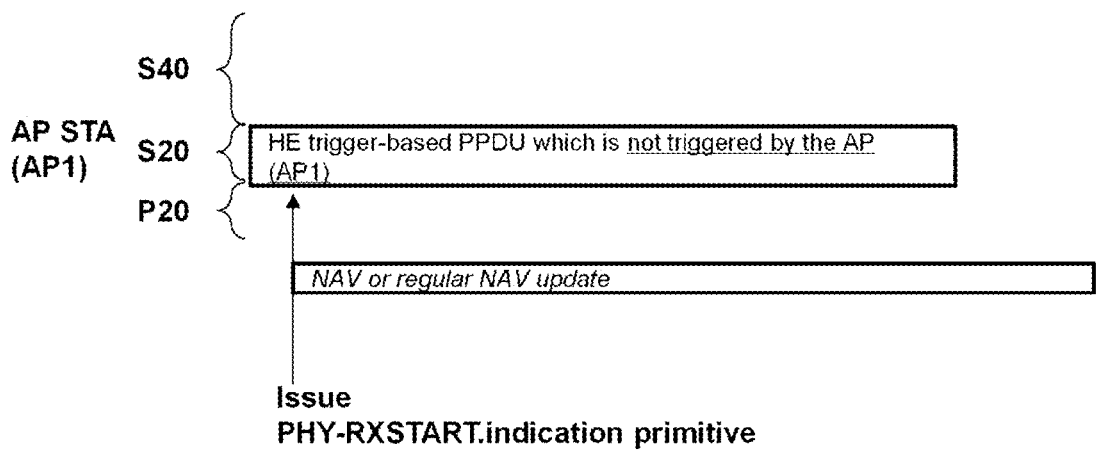

In the embodiment of FIG. 23, the first AP 1 receives an HE trigger-based PPDU not induced by the first AP AP1 through a secondary channel S20 other than the primary channel P20. Since the PPDU received by the first AP AP1 is the trigger-based PPDU, the first AP AP1 determines that the first AP AP1 receives a valid PPDU. Thus, when the signaling field of the PPDU is valid, the AP issues the PHY-RXSTART.indication primitive. At this time, the first AP AP1 updates the NAV based on the HE trigger-based PPDU. When the first AP AP1 uses the regular NAV and the Intra-BSS NAV, the first AP AP1 updates the regular NAV.

Figure 21:
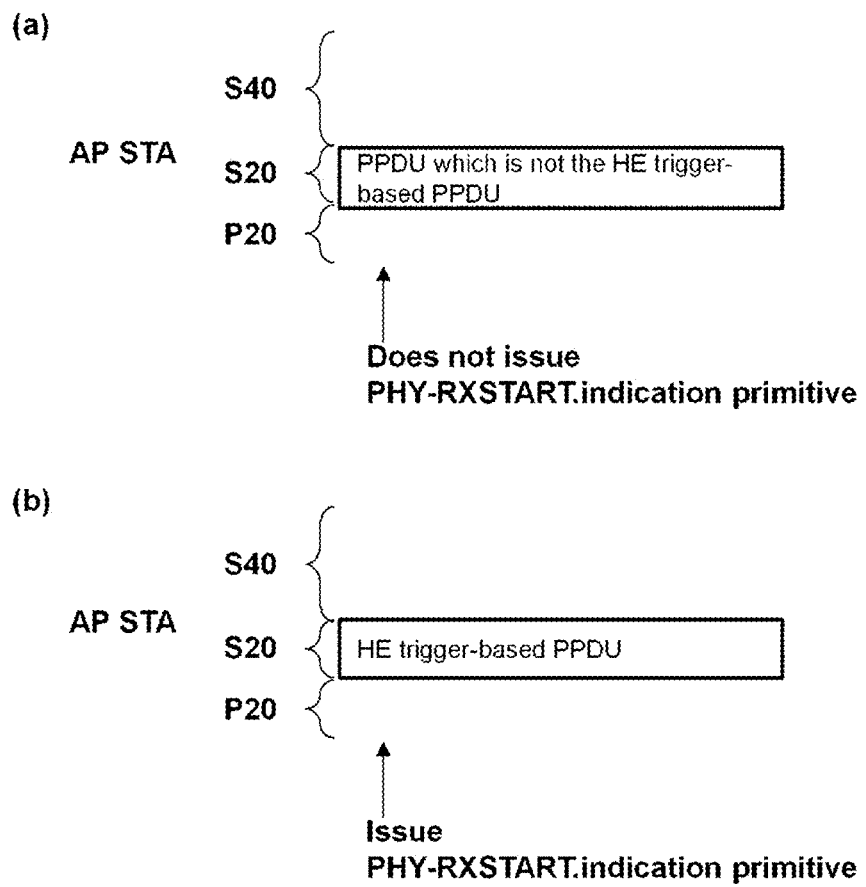

In the embodiment described with reference to FIGS. 21 to 23, the base wireless communication terminal may set the NAV even when the trigger-based PPDU is received through the secondary channel that does not overlap the primary channel. At this time, the base wireless communication terminal may not use the primary channel even when the primary channel is idle. Therefore, the efficiency of spatial reuse may be reduced. Further, since the wireless communication terminal other than the base wireless communication terminal does not set the NAV when the trigger-based PPDU is received through the secondary channel, the base wireless communication terminal may be disadvantageous in the channel access contention as compared to the wireless communication terminal other than the base wireless communication terminal. In addition, the base wireless communication terminal may be disadvantageous in the channel access contention as compared with a wireless communication terminal using only a frequency band having a bandwidth of 20 MHz. In order to solve this, embodiments of the present invention will be described with reference to FIGS. 24 to 30.

In a specific embodiment, when the base wireless communication terminal receives the trigger-based PPDU, the base wireless communication terminal may determine whether a valid PPDU is received according to the characteristics of the trigger-based PPDU. This will be described with reference to FIG. 24.

Figure 24:
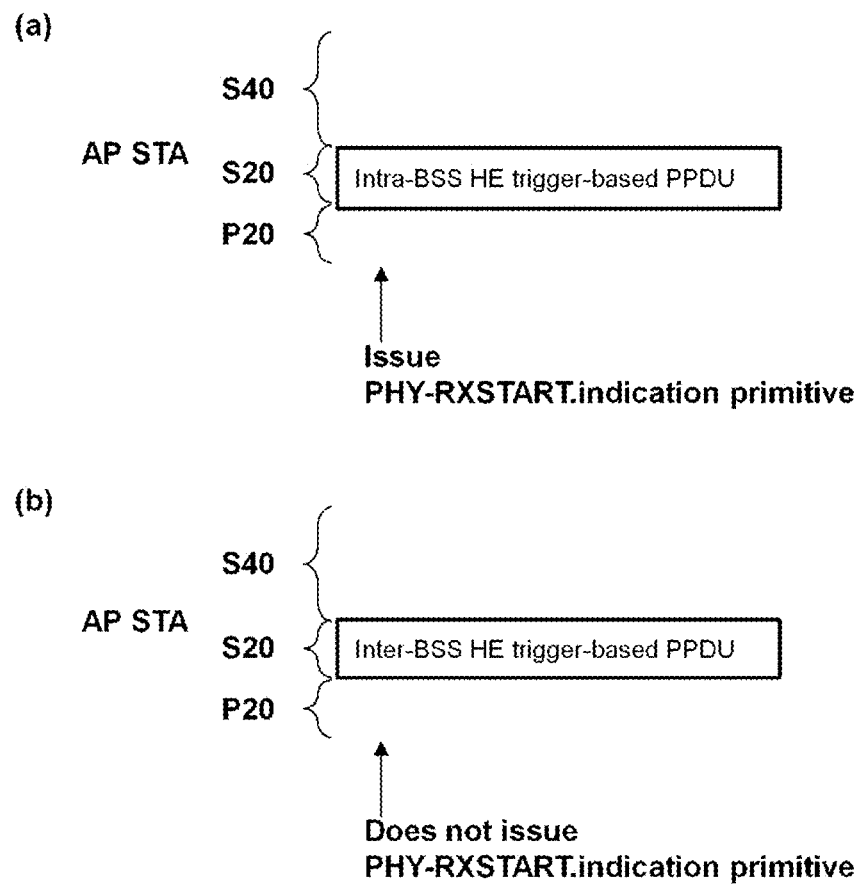

FIG. 24 show operations in which a wireless communication terminal according to another embodiment receives a PPDU and issues a PHY-RXSTART.indication.

When the base wireless communication terminal receives the trigger-based PPDU triggered by the base wireless communication terminal, the base wireless communication terminal may determine whether the base wireless communication terminal receives a valid PPDU regardless of the channel through which the trigger-based PPDU is transmitted. Specifically, when the base wireless communication terminal receives the trigger-based PPDU triggered by the base wireless communication terminal, the base wireless communication terminal may issue a PPDU reception start indicator regardless of the channel through which the trigger based PPDU is transmitted. In addition, when the base wireless communication terminal receives a PPDU other than the trigger-based PPDU triggered by the base wireless communication terminal through a frequency band that does not overlap the primary channel, the base wireless communication terminal may determines that the base wireless communication terminal receives an invalid PPDU. Specifically, when the base wireless communication terminal receives a PPDU other than the trigger-based PPDU triggered by the base wireless communication terminal through a frequency band that does not overlap the primary channel, the base wireless communication terminal may not issue the PPDU reception start indicator.

In addition, when the base wireless communication terminal receives the trigger-based PPDU that is the Intra-BSS PPDU, the base wireless communication terminal may determine whether the base wireless communication terminal receives a valid PPDU regardless of the channel through which the trigger-based PPDU is transmitted. Specifically, when the base wireless communication terminal receives the trigger-based PPDU that is the Intra-BSS PPDU, the base wireless communication terminal may issue the PPDU reception start indicator irrespective of the channel through which the trigger-based PPDU is transmitted. In addition, when the base wireless communication terminal receives the trigger-based PPDU that is the Inter-BSS PPDU through the frequency band that does not overlap the primary channel, the base wireless communication terminal may determine that the base wireless communication terminal receives an invalid PPDU. Specifically, when the base wireless communication terminal receives a trigger-based PPDU that is an Inter-BSS PPDU through a frequency band that does not overlap the primary channel, the base wireless communication terminal may not issue a PPDU reception start indicator.

Figure 25:
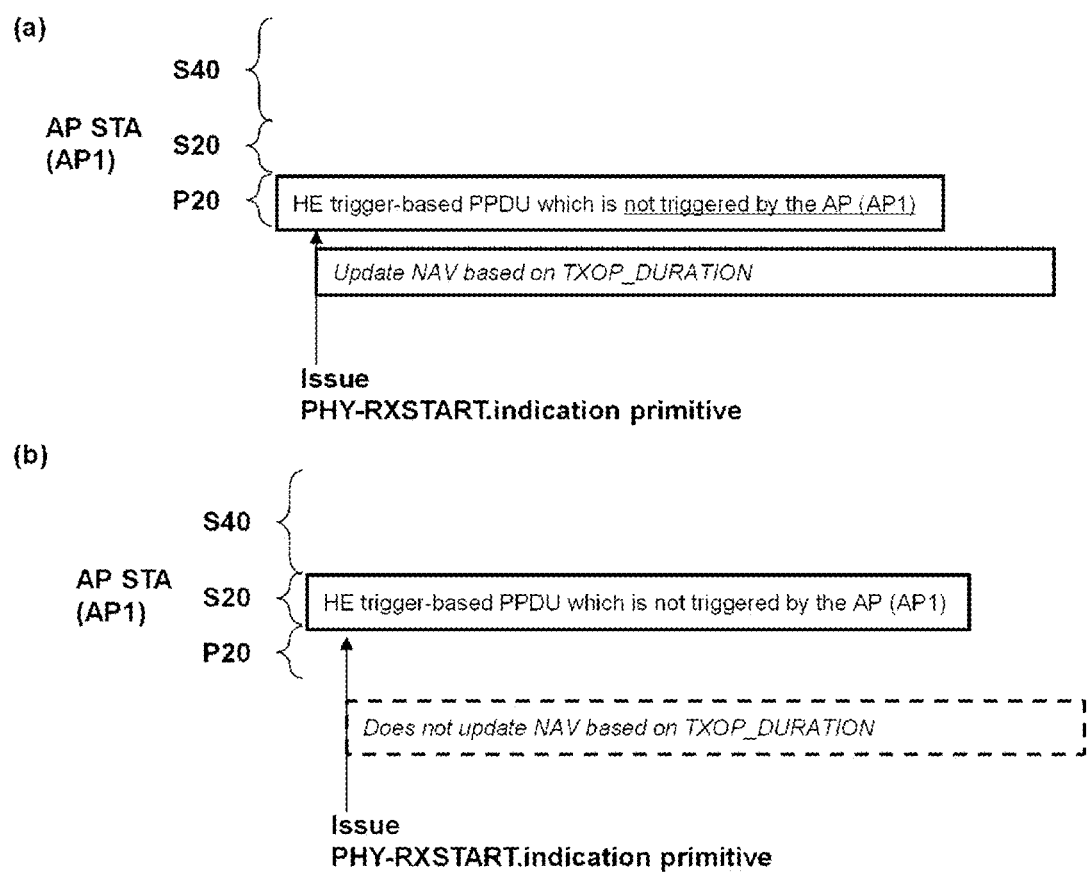
FIG. 25 and FIG. 26 show operations in which the wireless communication terminal according to another embodiment of the present invention receives the PPDU and issues the PHY-RXSTART.indication and updates the NAV.

In the embodiment of FIG. 25(*a*), the AP receives a trigger-based PPDU that is an Intra-BSS PPDU through a secondary channel S20 other rather than a primary channel P20. Since the AP is a trigger-based PPDU that is an Intra-BSS PPDU, it determines whether a valid PPDU is received. When it is determined that the AP receives a valid PPDU, the AP issue the PHY-RXSTART.indication primitive. In the embodiment of FIG. 24(*b*), the AP receives a trigger-based PPDU that is an Inter-BSS PPDU through a secondary channel S20 other rather than a primary channel P20. Since the AP is not a trigger-based PPDU that is an Intra-BSS PPDU, it does not determine that a valid PPDU is received. The AP does not issue the PHY-RXSTART.indication primitive. Through these embodiments, the base wireless communication terminal may prevent the channel access from being interrupted by the trigger-based PPDU transmitted from the other BSS and the base wireless communication terminal from not receiving the trigger-based PPDU transmitted to the base wireless communication terminal.

In a specific embodiment, when the base wireless communication terminal receives the trigger-based PPDU, the base wireless communication terminal may determine whether to update a valid NAV according to the characteristics of the trigger-based PPDU. This will be described with reference to FIGS. 25 to 28.

Figure 26:
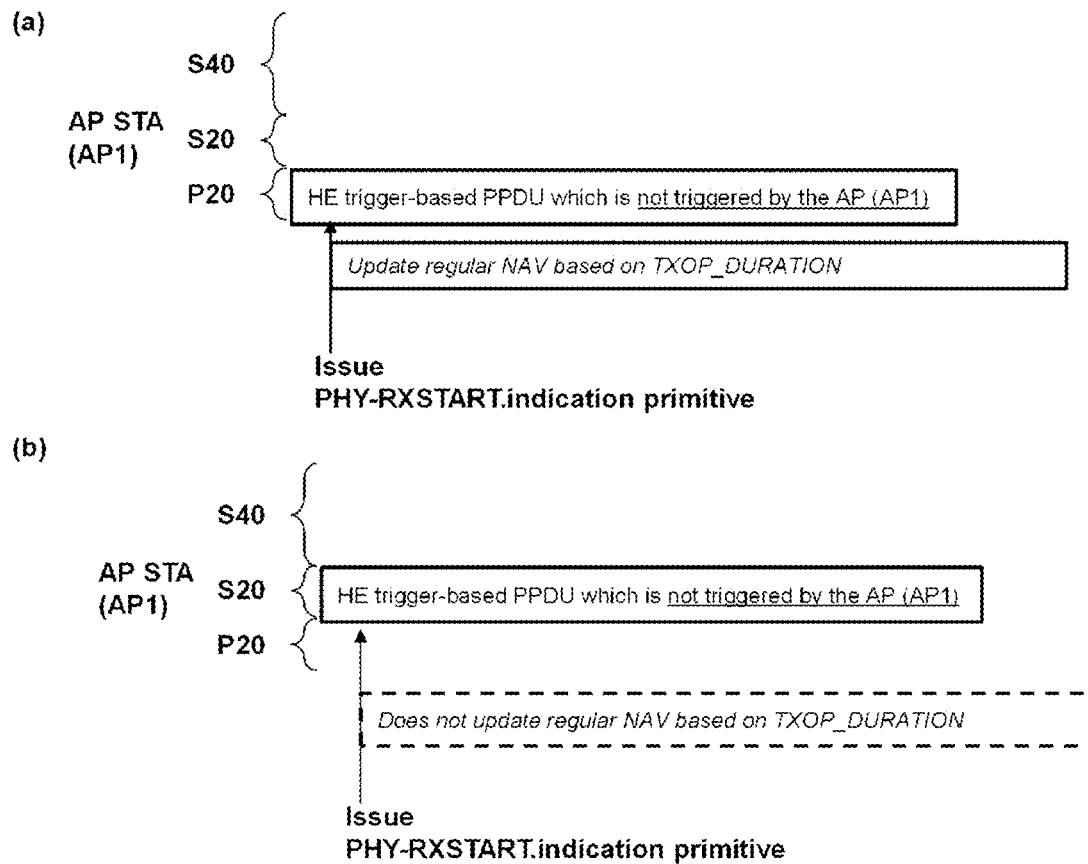

FIG. 25 and FIG. 26 show operations in which the wireless communication terminal according to another embodiment of the present invention receives the PPDU and issues the PHY-RXSTART.indication and updates the NAV.

As described above, when the base wireless communication terminal receives the trigger-based PPDU, the base wireless communication terminal may determine whether the base wireless communication terminal receives a valid PPDU regardless of the frequency band in which the trigger-based PPDU is transmitted. Specifically, when the base wireless communication terminal receives a PPDU through a frequency band that does not overlap with a primary channel and does not receive a trigger-based PPDU, the base wireless communication terminal may determine that the base wireless communication terminal receives an invalid PPDU. At this time, the base wireless communication terminal may determine whether to update the NAV based on the trigger-based PPDU according to the characteristics of the trigger-based PPDU.

At this time, when the base wireless communication terminal receives the trigger-based PPDU through the frequency band overlapping the primary channel, the base wireless communication terminal may update the NAV based on the trigger-based PPDU.

Specifically, when the base wireless communication terminal receives the trigger-based PPDU that is not triggered by the base wireless communication terminal through the frequency band overlapping the primary channel, the base wireless communication terminal may update the NAV based on the trigger-based PPDU.

In addition, when the base wireless communication terminal receives the trigger-based PPDU that is the Inter-BSS PPDU through the frequency band overlapping the primary channel, the base wireless communication terminal may update the NAV based on the trigger-based PPDU regardless of the channel through which the trigger-based PPDU is transmitted.

In the embodiment of FIG. 25(*a*), the first AP AP1 receives a trigger-based PPDU that is not triggered by the first AP AP1 through the primary channel P20. Since the first AP AP1 receives the trigger-based PPDU, it determines whether a valid PPDU is received. When it is determined that the first AP AP1 receives a valid PPDU, the first AP AP1 issues the PHY-RXSTART.indication primitive. Since the first AP AP1 receives the trigger-based PPDU that is not triggered by the first AP AP1 through the primary channel P20, it updates the NAV based on the trigger-based PPDU. In the embodiment of FIG. 25(*b*), the first AP AP1 receives a trigger-based PPDU that is not triggered by the first AP AP1 through the secondary channel S20 other than the primary channel P20. Since the first AP AP1 receives the trigger-based PPDU, the first AP AP1 determines whether a valid PPDU is received. When the first AP AP1 determines that the first AP AP1 receives a valid PPDU, the first AP AP1 issues the PHY-RXSTART.indication primitive. Since the first AP AP1 receives the trigger-based PPDU that is not triggered by the first AP AP1 through the secondary channel S20 other than the primary channel P20, the first AP AP1 does not update the NAV based on the trigger-based PPDU.

When the base wireless communication terminal uses the regular NAV and the Intra-BSS NAV, the base wireless communication terminal may selectively update the regular NAV and the Intra-BSS NAV according to whether the trigger-based PPDU is an Intra-BSS PPDU or an Inter-BSS PPDU.

Specifically, when the base wireless communication terminal receives the trigger-based PPDU that is not triggered by the base wireless communication terminal through the frequency band overlapping the primary channel, the base wireless communication terminal may update the regular NAV based on the trigger-based PPDU. In addition, when the base wireless communication terminal receives the trigger-based PPDU that is the Inter-BSS PPDU through the frequency band overlapping the primary channel, the base wireless communication terminal may update the regular NAV based on the trigger-based PPDU regardless of the channel through which the trigger-based PPDU is transmitted.

In the embodiment of FIG. 26(*a*), the first AP AP1 receives a trigger-based PPDU that is not triggered by the first AP AP1 through the primary channel P20. At this time, the trigger-based PPDU is the Inter-BSS PPDU. Since the first AP AP1 receives the trigger-based PPDU, it determines whether a valid PPDU is received. When it is determined that the first AP AP1 receives a valid PPDU, the first AP AP1 issues the PHY-RXSTART.indication primitive. Since the first AP AP1 receives the trigger-based PPDU that is not triggered by the first AP AP1 through the primary channel P20, the first AP AP1 updates the regular NAV based on the trigger-based PPDU. In the embodiment of FIG. 26(b), the first AP AP1 receives a trigger-based PPDU that is not triggered by the first AP AP1 through the secondary channel S20 other than the primary channel P20. At this time, the trigger-based PPDU is the Inter-BSS PPDU. Since the first AP AP1 receives the trigger-based PPDU, the first AP AP1 determines whether a valid PPDU is received. When the first AP AP1 determines that the first AP AP1 receives a valid PPDU, the first AP AP1 issues the PHY-RXSTART.indication primitive. Since the first AP AP1 receives the trigger-based PPDU that is not triggered by the first AP AP1 through the secondary channel S20 other than the primary channel P20, the first AP AP1 does not update the regular NAV based on the trigger-based PPDU.

Figure 27:
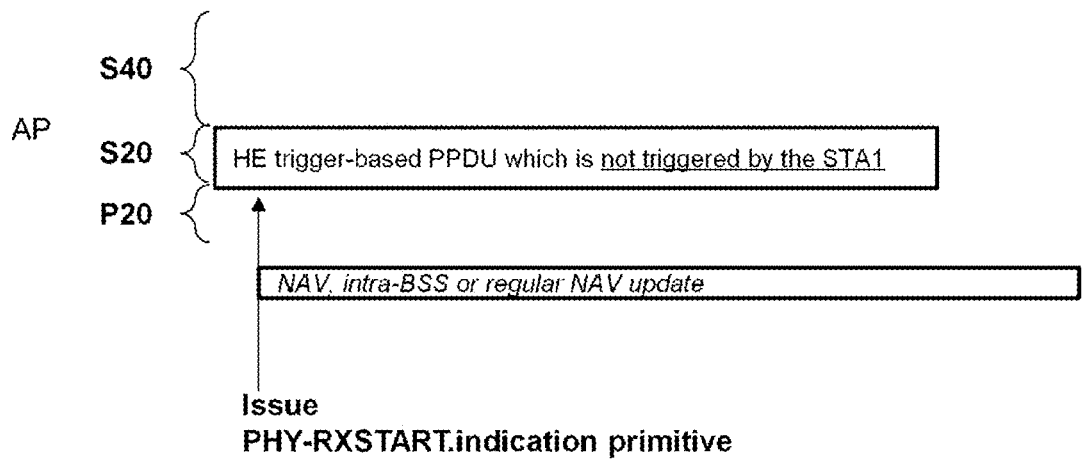
FIG. 27 shows operations of updating a NAV according to whether a trigger-based PPDU is triggered by a wireless communication terminal after a wireless communication terminal receives a PPDU and issues a PHY-RXSTART.indication according to another embodiment of the present invention.

FIG. 27 shows operations of updating a NAV according to whether a trigger-based PPDU is triggered by a wireless communication terminal after a wireless communication terminal receives a PPDU and issues a PHY-RXSTART.indication according to another embodiment of the present invention.

As described with reference to FIGS. 25 to 26, when the base wireless communication terminal receives the trigger-based PPDU, the base wireless communication terminal may determine whether the base wireless communication terminal receives a valid PPDU regardless of the frequency band in which the trigger-based PPDU is transmitted. At this time, when the base wireless communication terminal receives the trigger-based PPDU that is not triggered by the base wireless communication terminal, the base wireless communication terminal may update the NAV based on the trigger-based PPDU regardless of the frequency band through which the trigger-based PPDU is transmitted. Further, when the base wireless communication terminal receives the trigger-based PPDU triggered by the base wireless communication terminal, the base wireless communication terminal may update the NAV based on the trigger-based PPDU only when the trigger-based PPDU is transmitted through a frequency band overlapping the primary channel. Furthermore, when the base wireless communication terminal uses the regular NAV and the Intra-BSS NAV, the base wireless communication terminal may selectively update the regular NAV and the Intra-BSS NAV according to whether the trigger-based PPDU is an Intra-BSS PPDU or an Inter-BSS PPDU.

In the embodiment of FIG. 27, the AP receives a trigger-based PPDU that is not triggered by the AP through the secondary channel S20. Since the AP receives the trigger-based PPDU, the AP determines whether a valid PPDU is received. When the AP determines that the AP receives a valid PPDU, the AP issue the PHY-RXSTART.indication primitive. Since the AP receives a trigger-based PPDU that is not triggered by the AP, the AP updates the NAV based on the trigger-based PPDU. When the AP uses regular NAV and Intra-BSS NAV, the AP updates the regular NAV based on the trigger-based PPDU.

Figure 28:
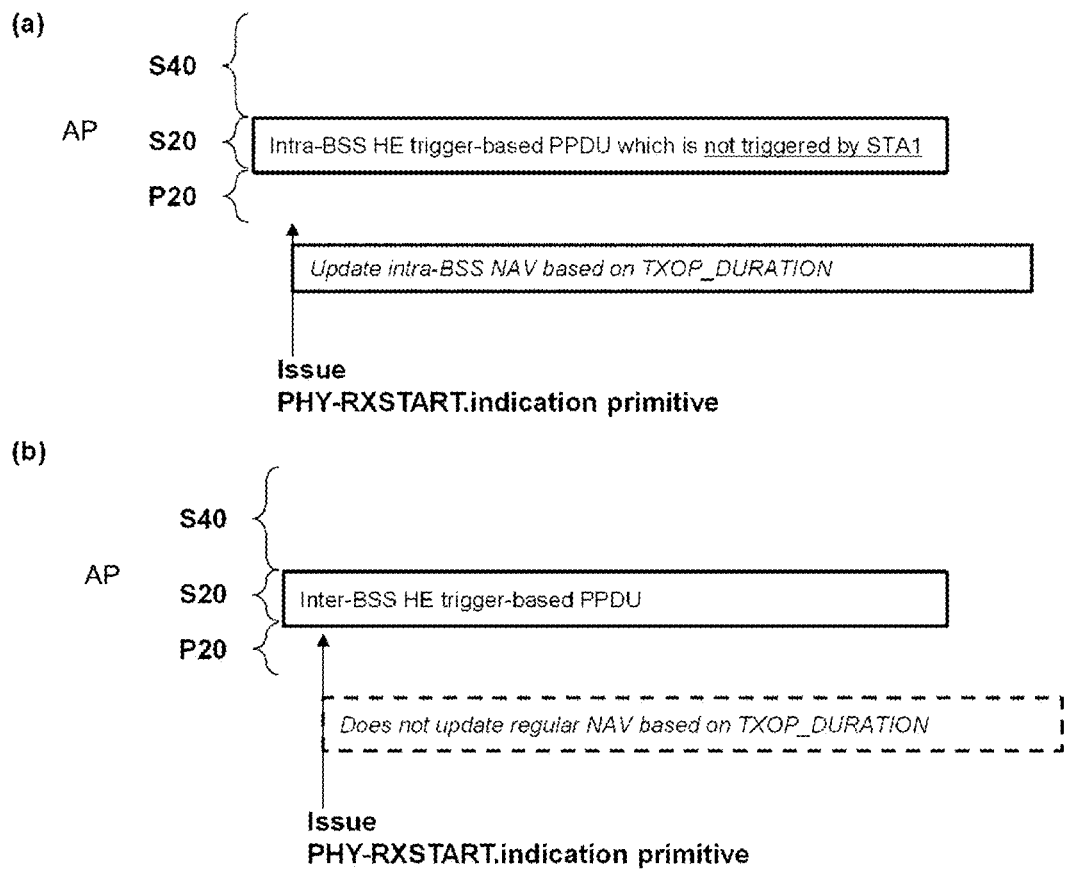
FIG. 28 shows operations of updating a NAV according to whether a trigger-based PPDU is an Intra-BSS PPDU after a wireless communication terminal receives a PPDU and issues a PHY-RXSTART.indication according to another embodiment of the present invention.

FIG. 28 shows operations of updating a NAV according to whether a trigger-based PPDU is an Intra-BSS PPDU after a wireless communication terminal receives a PPDU and issues a PHY-RXEND.indication according to another embodiment of the present invention.

As described with reference to FIGS. 25 to 26, when the base wireless communication terminal receives the trigger-based PPDU, the base wireless communication terminal may determine whether the base wireless communication terminal receives a valid PPDU regardless of the frequency band in which the trigger-based PPDU is transmitted. At this time, when the base wireless communication terminal receives the trigger-based PPDU that is the Intra-BSS PPDU and the base wireless communication terminal does not trigger the trigger-based PPDU, the base wireless communication terminal may update the NAV based on the trigger-based PPDU regardless of the frequency band in which the trigger-based PPDU is transmitted. Further, when the base wireless communication terminal receives the trigger-based PPDU that is the Inter-BSS PPDU, the base wireless communication terminal may update the NAV based on the trigger-based PPDU only when the trigger-based PPDU is transmitted through a frequency band overlapping the primary channel.

In the embodiment of FIG. 28(a), the AP receives a trigger-based PPDU that is an Intra-BSS PPDU through a secondary channel S20. Since the AP receives a trigger-based PPDU that is an Intra-BSS PPDU, the AP determines whether a valid PPDU is received. When the AP determines that the AP receives a valid PPDU, the AP issue the PHY-RXSTART.indication primitive. Since the AP receives a trigger-based PPDU that is an Intra-BSS PPDU and not triggered by the AP through the secondary channel, the AP updates the NAV based on the trigger-based PPDU. When the AP uses regular NAV and Intra-BSS NAV, the AP updates the regular NAV based on the trigger-based PPDU. In the embodiment of FIG. 28(b), the AP receives a trigger-based PPDU that is an Inter-BSS PPDU through a secondary channel S20. Since the AP receives a trigger-based PPDU that is an Intra-BSS PPDU, the AP determines whether a valid PPDU is received. When the AP determines that the AP receives a valid PPDU, the AP issue the PHY-RXSTART.indication primitive. Since the AP receives a trigger-based PPDU that is an Inter-BSS PPDU through the secondary channel S20, the AP does not update the NAV based on the trigger-based PPDU.

FIGS. 20 to 28 show the operation of the base wireless communication terminal in the 80 MHz bandwidth. However, the embodiment of the present invention is not limited thereto and may be all applied to base wireless communication terminals operating with a bandwidth (for example, 20 MHz, or 40 MHz) less than the 80 MHz bandwidth and a bandwidth (for example, 160 MHz, 80+80 MHz) greater than the 80 MHz bandwidth. In addition, the condition for updating the NAV in FIGS. 20 to 28 may be applied together with the condition for updating the NAV described with reference to FIG. 6 to FIG. 19.

Figure 29:
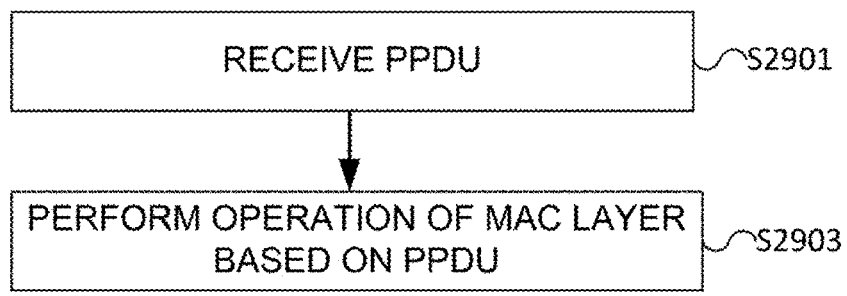
FIG. 29 shows the operation of a wireless communication terminal according to an embodiment of the present invention.

FIG. 29 shows the operation of a wireless communication terminal according to an embodiment of the present invention.

The wireless communication terminal receives the PPDU (S2901). The wireless communication terminal may determine whether the received PPDU is valid. At this time, the wireless communication terminal may determine whether the received PPDU is valid based on the signaling field of the received PPDU. When the received PPDU is valid, the wireless communication terminal may issue a received PPDU reception start indicator. In this case, the reception start indicator may be a PHY-RXSTART.indication primitive.

In addition, the wireless communication terminal may determine whether the received PPDU is valid based on whether the channel through which the received PPDU is transmitted is a primary channel. When the wireless communication terminal is a base wireless communication terminal, the wireless communication terminal may determine whether the received PPDU is valid based on whether the received PPDU is a trigger-based PPDU. Specifically, the base wireless communication terminal may determine whether the PPDU is valid PPDU based on whether the PPDU is a trigger-based PPDU triggered by the base wireless communication terminal. In a specific embodiment, when the PPDU received by the base wireless communication terminal is not the trigger-based PPDU triggered by the base wireless communication terminal and is transmitted through a frequency band that does not overlap the primary channel of the BSS operated by the base wireless communication terminal, the base wireless communication terminal may determine that the received PPDU is an invalid PPDU. For example, when the PPDU received by the base wireless communication terminal is not the trigger-based PPDU triggered by the base wireless communication terminal and is transmitted through a frequency band that does not overlap the primary channel of the BSS operated by the base wireless communication terminal, the base wireless communication terminal may not issue the PPDU reception start indicator. When the PPDU received by the base wireless communication terminal is a trigger-based PPDU triggered by the base wireless communication terminal, even when the PPDU is transmitted through a frequency band that does not overlap the primary channel of the BSS operated by the base wireless communication terminal, the base wireless communication terminal may generate an indicator indicating the PPDU reception start based on the signaling field of the corresponding PPDU.

The base wireless communication terminal may determine whether it is a valid PPDU according to the embodiments described with reference to FIG. 20 to FIG. 28.

The wireless communication terminal performs the operation of the MAC layer based on the received PPDU (S2903). Specifically, the wireless communication terminal may set the NAV based on the PPDU. In a specific embodiment, the wireless communication terminal may set the NAV based on the duration information indicated by the signaling field of the PPDU. For example, the wireless communication terminal may set the NAV based on the TXOP_DURATION field of the signaling field of the PPDU. Further, the wireless communication terminal may set the NAV based on the frame included in the PPDU. For example, the wireless communication terminal may set the NAV based on the duration field of the frame included in the PPDU.

The wireless communication terminal may obtain the trigger frame from the received PPDU and update the NAV based on the trigger frame. At this time, the trigger frame may be an Intra-BSS frame. That is, the wireless communication terminal may receive the PPDU from the base wireless communication terminal associated with the wireless communication terminal. In addition, the trigger frame may trigger an immediate response as described above. In addition, the wireless communication terminal may transmit the trigger-based PPDU to the base wireless communication terminal based on the trigger frame regardless of the value of the NAV set by the Intra-BSS frame. Also, the wireless communication terminal may set the NAV based on the trigger frame regardless of the receiver address of the trigger frame. Further, the wireless communication terminal may set the NAV based on the trigger frame regardless of whether the trigger frame triggers the transmission of the wireless communication terminal.

In another specific embodiment, the trigger frame may indicate whether the wireless communication terminal that is triggered by the trigger frame is required to perform the CS before transmitting the trigger-based PPDU based on the trigger frame. Specifically, the trigger frame may include the CS required field described above. When the wireless communication terminal triggered by the trigger frame indicates that it is required to perform the CS before transmitting the trigger-based PPDU based on the trigger frame, the wireless communication terminal may update the NAV based on the trigger frame. In a specific embodiment, when the channel for transmitting the trigger-based PPDU is sensed to be busy by the CS of the wireless communication terminal, the wireless communication terminal may update the NAV based on the trigger frame. Further, the wireless communication terminal may update the NAV based on the time required for the CS and the trigger frame. Specifically, the wireless communication terminal may set the NAV based on the time excluding the time taken for the CS in the duration indicated by the duration information. At this time, the duration information may be obtained based on the trigger frame or the PPDU including the trigger frame.

The wireless communication terminal may set the NAV according to the embodiments described with reference to FIG. 6 to FIG. 18

In addition, the trigger frame may include the padding field described above. At this time, the length of the padding field may be set according to the embodiments described with reference to FIG. 19.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal associated with a base wireless communication terminal, the wireless communication terminal comprising:
   a transceiver; and
   a processor,
   wherein the processor is configured to: receive a Physical layer Protocol Data Unit (PPDU) from the base wireless communication terminal using the transceiver, when a trigger frame is obtained from the PPDU, update an Intra-BSS Network Allocation Vector (NAV) based on the trigger frame without considering whether the trigger frame triggers the transmission of the wireless communication terminal,
wherein the trigger frame triggers transmission of at least one wireless communication terminal, a receiver address of the trigger frame is an medium access control (MAC) address of the wireless communication terminal, the trigger frame indicates that channel sensing is required before transmitting a trigger-based PPDU based on the trigger frame, and a channel for transmitting the trigger-based PPDU is sensed to be busy by the channel sensing,
wherein the Intra-BSS NAV is a NAV updated by an Intra-BSS frame.

2. The wireless communication terminal of claim 1, wherein the processor is configured to update the Intra-BSS NAV based on the trigger frame without considering whether the trigger frame triggers the transmission of the wireless communication terminal when the trigger frame is obtained from the PPDU.

3. The wireless communication terminal of claim 2, wherein the processor is configured to update the Intra-BSS NAV based on a time required for the channel sensing and the trigger frame.

4. An operation method of a wireless communication terminal associated with a base wireless communication terminal, the method comprising:
receiving a Physical layer Protocol Data Unit (PPDU) from the base wireless communication terminal;
obtaining a frame from the PPDU;
determine whether the obtained frame is a trigger frame or not, and
updating an Intra-BSS Network Allocation Vector (NAV) based on whether the obtained frame is a trigger frame or not,
wherein the updating the Intra-BSS NAV comprises
upon the obtained frame being the trigger frame, updating, based on the obtained frame, the Intra-BSS NAV without considering whether the trigger frame triggers the transmission of the wireless communication terminal,
wherein the trigger frame triggers transmission of at least one wireless communication terminal, a receiver address of the trigger frame is an address of the wireless communication terminal, the trigger frame indicates that channel sensing is required before transmitting a trigger-based PPDU based on the trigger frame and a channel for transmitting the trigger-based PPDU is sensed to be busy by the channel sensing,
wherein the Intra-BSS NAV is a NAV updated by an Intra-BSS frame.

5. The method of claim 4, wherein the updating of the Intra-BSS NAV comprises when the obtained frame is the trigger frame, updating the Intra-BSS NAV based on the trigger frame regardless of whether the trigger frame triggers the transmission of the wireless communication terminal.

6. The method of claim 4, wherein the updating of the Intra-BSS NAV comprises updating the NAV based on a time required for the channel sensing and the trigger frame.

* * * * *